United States Patent
Bremer et al.

(10) Patent No.: US 8,036,212 B2
(45) Date of Patent: Oct. 11, 2011

(54) SYSTEMS AND METHODS FOR INTEGRATING ANALOG VOICE SERVICE AND DERIVED POTS VOICE SERVICE IN A DIGITAL SUBSCRIBER LINE ENVIRONMENT

(75) Inventors: Gordon Bremer, Clearwater, FL (US); Joe Chapman, Seminole, FL (US); Bob Scott, Largo, FL (US); Ed Thoenes, Largo, FL (US)

(73) Assignee: Paradyne Corporation, Largo, FL (US)

( * ) Notice: Subject to any disclaimer, the term of this patent is extended or adjusted under 35 U.S.C. 154(b) by 1098 days.

(21) Appl. No.: 11/551,840

(22) Filed: Oct. 23, 2006

(65) Prior Publication Data
US 2007/0047730 A1 Mar. 1, 2007

Related U.S. Application Data

(63) Continuation of application No. 10/266,897, filed on Oct. 7, 2002, now Pat. No. 7,127,048.

(51) Int. Cl.
*H04L 12/66* (2006.01)

(52) U.S. Cl. .................... 370/354; 379/90.01
(58) Field of Classification Search .............. 370/354, 370/217, 242, 356, 468, 349, 401; 379/90, 379/212, 93.01; 709/202–203
See application file for complete search history.

(56) References Cited

U.S. PATENT DOCUMENTS

| | | |
|---|---|---|
| 4,637,035 A | 1/1987 | Betts |
| 5,048,076 A | 9/1991 | Maurer et al. |
| 5,301,246 A | 4/1994 | Archibald et al. |
| 5,475,691 A | 12/1995 | Chapman et al. |
| 5,559,792 A | 9/1996 | Bottoms et al. |
| 5,636,282 A | 6/1997 | Holmquist et al. |
| 5,661,785 A | 8/1997 | Carpenter et al. |
| 5,719,922 A | 2/1998 | Bremer et al. |
| 5,826,034 A | 10/1998 | Albal |
| 5,838,665 A | 11/1998 | Kahn et al. |
| 5,898,761 A | 4/1999 | McHale et al. |
| 5,963,620 A * | 10/1999 | Frankel et al. ............. 379/93.05 |
| 5,991,293 A | 11/1999 | Buchanan et al. |
| 6,031,897 A | 2/2000 | Bremer et al. |
| 6,075,784 A | 6/2000 | Frankel et al. |
| 6,128,293 A | 10/2000 | Pfeffer |
| 6,175,565 B1 * | 1/2001 | McKinnon et al. ........... 370/354 |
| 6,307,923 B1 | 10/2001 | Bremer et al. |
| 6,633,639 B1 | 10/2003 | Ludford |
| 6,757,379 B1 | 6/2004 | Lane |
| 6,760,421 B2 | 7/2004 | Heilmann et al. |
| 6,771,740 B1 | 8/2004 | Bingel |
| 7,127,048 B2 | 10/2006 | Bremer et al. |
| 2002/0168057 A1 * | 11/2002 | Davis ......................... 379/93.35 |
| 2003/0147381 A1 * | 8/2003 | Nelson et al. ................. 370/352 |

* cited by examiner

*Primary Examiner* — Curtis Kuntz
*Assistant Examiner* — Maria El-Zoobi
(74) *Attorney, Agent, or Firm* — Thomas, Kayden, Horstemeyer & Risley, LLP

(57) ABSTRACT

Systems and methods for integrating analog voice service and derived POTS voice service in a DSL environment are provided. One embodiment is a system comprising: a first communication path for carrying plain old telephone service (POTS) voice signals between a telephone-type device and a subscriber line of a telephone network; a second communication path for carrying derived POTS voice signals between the telephone-type device and the subscriber line; and a switching mechanism configured to switch the telephone-type device between the first communication path and the second communication path.

24 Claims, 15 Drawing Sheets

SYSTEMS AND METHODS FOR INTEGRATING ANALOG VOICE SERVICE AND DERIVED POTS VOICE SERVICE IN A DIGITAL SUBSCRIBER LINE ENVIRONMENT

CROSS REFERENCE TO RELATED APPLICATION

This application is a continuation of U.S. patent application Ser. No. 10/266,897, filed Oct. 7, 2002, which is herein incorporated by reference.

TECHNICAL FIELD

The present invention is generally related to digital subscriber line (DSL) technology and, more particularly, is related to systems and methods for integrating analog voice service (e.g., plain old telephone services (POTS)) and derived POTS voice services in a digital subscriber line environment.

BACKGROUND OF THE INVENTION

As bandwidth demands have increased, service providers have looked for ways to increase data transmission performance over the copper wire local loop transmission lines that connect telephone central offices (COs) to customer premises (CPs). In conventional telephony networks, customer premises equipment (CPE) is coupled to CO switches over the copper wire local loop transmission lines, which are commonly known as "local loops," "subscriber lines," "subscriber loops," "loops," or the "last mile" of the telephone network. In the art, the term "line" and "loop" are used interchangeably, both terms referring to the copper wire pair used in a typical telephone transmission line conductor. Historically, the public switched telephone network (PSTN) evolved with subscriber loops coupled to a telephone network with circuit-switched capabilities that were designed to carry analog voice communications. "Central office" or "CO" includes any site where a subscriber loop couples to a telephony switching unit, such as a public switched telephone network (PSTN), a private branch exchange (PBX) telephony system, or any other location functionally coupling subscriber loops to a telephony network. The provisioning of digital service to the CP is a more recent development. With it, the telephone network has evolved from a system capable of only carrying analog voice communications into a system that can simultaneously carry voice and digital data. Historically, the POTS subscriber loop was designed with the functions needed to communicate analog voice-conversation signals and subscriber loop signaling. The CO switch uses subscriber loop signaling to notify the customer premises about events in the telephone network, while customer premises equipment (CPE) use subscriber loop signaling to inform the CO to perform actions for the customer. Some examples of subscriber loop signaling include: the CO switch signaling to the CPE that an incoming call has arrived by ringing the phone, the CPE (e.g., a telephone) signaling to the CO switch that the CPE is initiating a call by an on-hook to off-hook transition of the telephone handset, and the CPE signaling to the CO switch that a call should be connected to a location by transmitting the phone number of the location.

Because of the prohibitive costs of replacing or supplementing existing subscriber loops, technologies have been implemented that utilize existing subscriber loops to provide easy and low cost migration to digital technologies. Subscriber loops capable of carrying digital signals are known as digital subscriber lines (DSLs). Various digital technologies provide customers with additional flexibility and enhanced services by utilizing frequency-division multiplexing and/or time-division multiplexing techniques to fully exploit the transmission capability of a subscriber loop. These newer DSL technologies provide digital service to the customer premises without significantly interfering with the existing plain old telephone service (POTS) equipment and wiring by utilizing portions of the available frequency spectrum not used by a POTS signal. These portions of the frequency spectrum are often referred to as "logical channels." Logical channels within a subscriber line that carry digital signals are known as "DSL channels," while logical channels within a subscriber line which carry POTS analog signals are known as "POTS channels."

DSL technologies, such as but not limited to, integrated services digital network (ISDN), high-bit-rate digital subscriber line (HDSL), HDSL2, and symmetric digital subscriber line (SDSL), utilize different frequencies of the available frequency spectrum and therefore do not coexist with a POTS signal, which typically utilizes the 0-4 kilo-hertz (KHz) portion of the available frequency spectrum. These DSL technologies accomplish this functionality by frequency-division multiplexing (FDM) a single data signal onto a logical channel above (at higher frequencies than) the 0 KHz to 4 KHz frequency range used by the analog POTS signals. Such multiplexing techniques and terminology are common to those skilled in the art, and are not described in detail herein.

Several variations of new multiple channel DSL technology exist, such as, but not limited to, Asymmetric Digital Subscriber Line (ADSL), Rate Adaptive Digital Subscriber Line (RADSL), Very High Speed DSL (VDSL), Multiple Virtual Lines (MVL™), Tripleplay™, and ReachDSL™, with this group generally referred to as xDSL. Communications systems employing xDSL technology may multiplex a plurality of data signals and a single POTS signal onto a single subscriber line. An xDSL system employing frequency-division multiplexing would multiplex a plurality of data signals onto a corresponding plurality of logical channels, each logical channel utilizing a different portion of the available frequency spectrum. An xDSL system employing time-division multiplexing would multiplex a plurality of data signals onto a single logical channel with each different data signal allocated to a predefined portion of time in a predefined, repeating time period.

As xDSL technologies have developed over the years, a number of service providers have leveraged the local loop by enabling the transmission of voice calls over the existing DSL network via the DSL channel(s) rather than the POTS channel(s). For example, one or more service providers may combine to offer the following services to a customer premises: (1) normal baseband POTS over a POTS channel; (2) data services over a DSL channel; and (3) data voice services via a derived POTS channel, which is multiplexed with the DSL channel. In operation, the derived POTS channel is typically digitized, multiplexed with the DSL channel, and communicated to the CO via the local loop using one of the following, or other, protocols: voice over DSL (VoDSL); continuous bit rate (CBR); voice over Internet Protocol (IP) (VoIP); voice telephony over Asynchronous Transfer Mode (ATM) (VoATM); or voice over Frame Rely (VoFR).

Data voice services, voice over DSL (VoDSL) services, derived telephony services, derived POTS voice services, etc. are typically implemented by providing an integrated access device (IAD) at the customer premises. Commercial implementations of an IAD include the SuperLine™ series of IADs manufactured by Paradyne Networks, Inc. As known in the art, in general, an IAD interfaces with the local loop at the customer premises and integrates voice transmission and data transmission onto the DSL line. Typically, an IAD supports a number of analog POTS ports to allow connections for telephones, facsimile machines, key systems, and modems. An IAD also supports a number of ports to allow connections for telephones that support data voice (e.g., VoIP phone, etc.). An IAD also includes one or more data ports with multiple networking interfaces for supporting data communications via the DSL channel. In this regard, a typical IAD provides a single point of access at the customer premises that can simultaneously deliver POTS and other switch-related services to a telephone, derived POTS voice services to a properly-configured device (e.g., VoIP phone, etc.), and data services to a computing device.

A typical IAD, or similar customer premise equipment (CPE), may integrate analog voice services with derived POTS voice services in the sense that both services may be provided to separate ports in the IAD. For example, a typical IAD may be configured to provide derived POTS voice services to a VoIP telephone via one port and analog voice services to a telephone via another port (e.g., register jack-11 (RJ-11) connector). Thus, the two services are "integrated" in the sense that they are integrated within the CPE to separate ports. However, existing IADs do not integrate analog voice services with derived POTS voice services at a single port to a telephone.

Thus, there is a need in the industry for systems and methods for integrating analog voice services and derived POTS voice services in a DSL environment.

SUMMARY OF THE INVENTION

The present invention provides systems and methods for integrating analog voice service and derived POTS voice service in a DSL environment.

One embodiment is a system comprising: first communication path for carrying plain old telephone service (POTS) voice signals between a telephone-type device and a subscriber line of a telephone network; a second communication path for carrying derived POTS voice signals between the telephone and the subscriber line; and a switching mechanism configured to switch the telephone-type device between the first communication path and the second communication path.

Briefly described, another such system comprises: a first communication path for carrying plain old telephone service (POTS) voice signals between a telephone and a digital subscriber line (DSL) in the local loop of a telephone network; a second communication path for carrying derived POTS voice signals between the telephone and the DSL; and a means for switching the telephone-type device between the first communication path and the second communication path.

A further embodiment comprises a method for integrating derived telephone voice service and plain old telephone service (POTS) in a digital subscriber line environment. Briefly described, one such method comprises the steps of: electrically connecting to a telephone and a subscriber line; and switching communication with the telephone-type device and the subscriber line between plain old telephone service (POTS) and derived POTS voice service.

A further embodiment comprises a method for offering voice services to a subscriber in a digital subscriber line (DSL) environment. Briefly described, one such method comprises the steps of: offering at least one of analog voice service and derived POTS voice service to a subscriber via a subscriber line; and offering a voice channel selection service to the subscriber whereby the subscriber may select which of the at least one of analog voice service and derived POTS voice service to utilize for a voice call.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
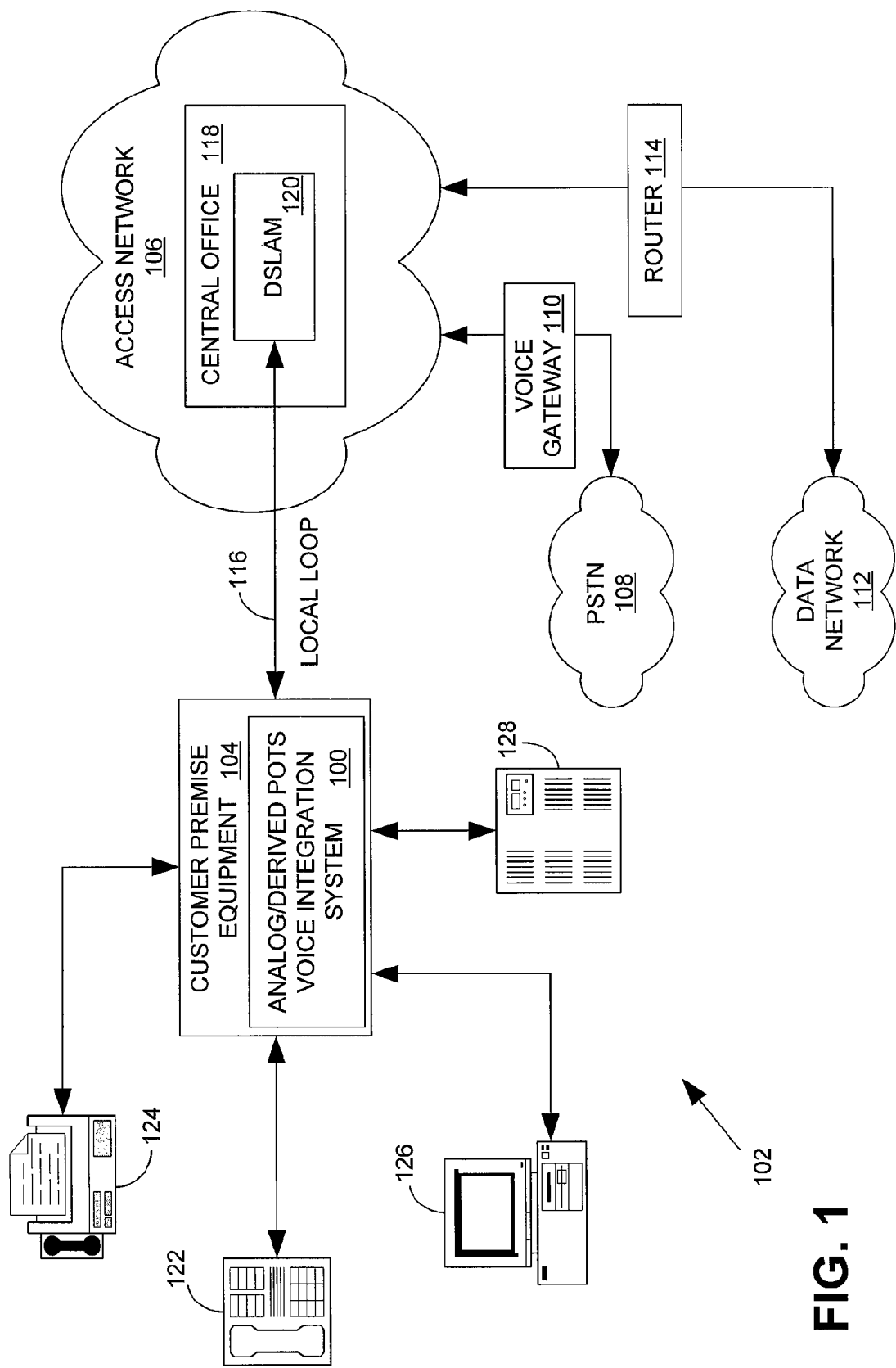
FIG. 1 is a block diagram of a digital subscriber line (DSL) environment in which various systems and methods according to the present invention for integrating analog voice services and derived POTS voice services may be implemented.

FIG. 1 is a block diagram of a digital subscriber line (DSL) environment 102 in which an analog/derived POTS voice integration system 100 according to the present invention for integrating analog voice services (e.g., plain old telephone services (POTS)) and derived POTS voice services may be implemented. As described in greater detail below, derived POTS voice services may include voice services provided via a data channel comprising digitized voice, which is multiplexed with DSL data (i.e., a derived POTS voice channel). Various embodiments of systems and methods for integrating analog voice services and derived POTS services will be described in detail below with respect to the various figures. Nonetheless, as an introductory matter, the general operation, architecture, and/or functionality of various exemplary embodiments of analog/derived POTS voice integration system 100 will be described briefly.

In general, an embodiment of analog/derived POTS voice integration system 100 may be implemented in customer premise equipment (CPE) 104 to enable a user of a telephone-type device (e.g., a telephone 122, a computer 126 having a speaker and microphone, a facsimile machine 124, etc.) to receive both analog voice services (e.g., POTS) via an analog voice-frequency channel and derived POTS voice services via a data channel comprising digitized voice, which is multiplexed with DSL data (i.e., a derived POTS voice channel). For example, analog/derived POTS voice integration system 100 also enables a user of a telephone-type device to select whether a voice call (incoming and/or outgoing) will be processed using analog voice service or derived POTS voice service. In this regard, analog/derived POTS voice integration system 100 enables the user to select whether a voice call is to be processed using an analog voice frequency channel or a derived POTS voice channel. Thus, analog/derived POTS voice integration system 100 may be viewed as providing a voice channel selection service and/or function to a user of a telephone-type device.

As described in more detail below, the user may, for example, establish a derived POTS voice call on a derived POTS voice channel via local loop 116. During the derived POTS voice call, analog/derived POTS voice integration system 100 may monitor an analog voice-frequency channel to determine whether there is an incoming call. If an incoming call is detected on the analog voice-frequency channel, analog/derived POTS voice integration system 100 may then integrate various analog voice services provided via the voice-frequency channel with various derived POTS services provided via the derived POTS channel. For example, in this regard, analog/derived POTS voice integration system 100 may detect the incoming baseband call, determine the manner in which the incoming baseband call is to be processed (i.e., determine call processing instruction(s) for the incoming baseband call), and then process the incoming baseband call according to the call processing instruction(s). It should be appreciated that analog/derived POTS voice integration system 100 may also monitor the derived POTS channel to determine whether there is an incoming call, which may occur while a baseband POTS voice call is active via an analog voice-frequency channel. In this regard, all of the analog/derived POTS voice integration functions described relative to the analog voice services may also be extended to derived POTS voice services.

Furthermore, one of ordinary skill in the art will appreciate that the call processing instruction(s) may be determined in a variety of ways. In certain embodiments, analog/derived POTS voice integration system 100 may facilitate communication with the user of telephone-type device, during which analog/derived POTS voice integration system 100 receives call processing instruction(s) provided by the user. For example, analog/derived POTS voice integration system 100 may notify the user of telephone-type device that there is an incoming baseband call (e.g., provide a notification signal, flash a display, etc.). The user may then specify to analog/derived POTS voice integration system 100 the manner in which the incoming baseband call is to be processed. In this manner, analog/derived POTS voice integration system 100 may enable the user to, for example, place the derived POTS voice call on hold and answer the incoming baseband call, conference the incoming baseband call with the derived POTS voice call, etc.

In other embodiments, analog/derived POTS voice integration system 100 may determine the call processing instruction(s) based on logic (e.g., software, firmware, and/or hardware or any combination thereof) residing in analog/derived POTS voice integration system 100 and/or external logic with which analog/derived POTS voice integration system 100 is in communication. Thus, analog/derived POTS voice integration system 100 may implement logic which provides any of a number of functions related to integrating analog voice services and derived POTS voice services. For example, the incoming baseband call may be answered via an answering machine function. Analog/derived POTS voice integration system 100 may be configured to implement any of the following, or other, call processing functions, which are described in more detail below:

(1) automatic call-back of the incoming baseband call via a derived POTS voice channel;

caller identification screening;

call waiting;

general identification screening (see commonly-assigned U.S. Pat. No. 5,301,246, entitled "Data Communications Equipment Security, U.S. Pat. No. 5,636,282, entitled "Method For Dial-In Security Using a Multimedia Modem, each of which is incorporated by reference in its entirety);

voice quality of service (QoS) selection and/or control (see commonly-assigned U.S. Pat. No. 5,475,691, entitled "Voice Activated Data Rate Change in Simultaneous Voice and Data Transmission"; U.S. Pat. No. 6,031,897, entitled "Apparatus & Method for User Tone Notification During Data Suspension or Degradation"; U.S. Pat. No. 6,307,923, entitled "Apparatus & Method for User Tone Warning During Data Suspension or Degradation"; each of which is hereby incorporated by reference in its entirety.

call processing via voice control;

call processing via interactive voice response (IVR) system;

audio and/or visual notification of incoming baseband call.

It should be noted that analog/derived POTS voice integration system 100 also enables a user to automatically initiate a call via a derived POTS voice channel. For example, analog/derived POTS voice integration system 100 may be configured to determine that telephone-type device is taken off-hook by receiving an associated signal provided by telephone-type device. Analog/derived POTS voice integration system 100 may then present a dial tone to telephone-type device, after which a user may initiate a call via a voice-frequency analog channel.

Having described the general architecture, operation, and/or functionality of a number of representative embodiments of analog/derived POTS voice integration system 100, the various components of DSL environment 102 will be described with reference to FIG. 1. As known in the art, digital subscriber line environment 102 provides an environment in which one or more service providers may provide increased data transmission services, analog voice services, derived POTS voice services, etc. over the copper wire local loop transmission line(s) 116 that connects a telephone central office 118 to customer premise equipment 104. In this regard, DSL environment 102 comprises customer premise equipment (CPE) 104 in communication with an access network 106 via local loop 116. As known in the art, in one of a number of embodiments of DSL environment 102, CPE 104 may be located on the premises of a number of customers (e.g., a residential customer, a business customer, etc.) and connected to any of a number of central offices 118 located within access network 106 via local loop 106. Nonetheless, for clarity and simplicity, DSL environment 102 is illustrated in FIG. 1 with one CPE 104 and one central office 118.

As stated above, customer premises equipment (CPE) 104 are coupled to central offices switches 118 over the copper wire local loop transmission lines, which are commonly known as "local loops," "subscriber lines," "subscriber loops," "loops," or the "last mile" of the telephone network (local loop 116). In the art, the term "line" and "loop" are used interchangeably, both terms referring to the copper wire pair used in a typical telephone transmission line conductor. Historically, the public switched telephone network (PSTN) evolved with subscriber loops coupled to a telephone network with circuit-switched capabilities that were designed to carry analog voice communications. "Central office" or "CO" includes any site where a subscriber loop couples to a telephony switching unit, such as a public switched telephone network (PSTN), a private branch exchange (PBX) telephony system, other key systems, or any other location functionally coupling subscriber loops to a telephony network.

CPE 104 may comprise any of a number of different types of devices, such as, an integrated access device (IAD). As known in the art, an IAD is a device that interfaces with the DSL access line (i.e., local loop 116) at the customer premises and which integrates voice and data transmission on the DSL line. An IAD typically includes support for a number of analog ports to allow connections for telephones 122, facsimile machines 124, key systems, a private branch exchange (PBX) 128, modems, etc. In general, an IAD converts the voice and signaling to data packets (e.g., ATM cells) that are transported across the DSL link to the access network and to the PSTN 108 via voice gateway 110. An IAD also includes one or more data ports to allow connections to various data equipment (e.g., computer 126, data telephones, etc.) for support of data traffic. In handling data and various Internet-related applications, the IAD may support bridging, routing, etc. and other Internet Protocol (IP) functions, such as address translation, security, etc.

In this regard, access network 106 may communicate with a public switched telephone network (PSTN) 108 via a voice gateway 110 and with a data network 112 via a router 114. In this regard, access network 106 may further comprise a digital subscriber line access multiplexer (DSLAM) 120 located at central office 118 for separating voice-frequency analog signals providing analog voice services from digital data signals providing high-speed data services, derived POTS voices services, etc.

One of ordinary skill in the art will appreciate that DSL environment 102 may be configured to provide any of a variety of types of DSL technologies. For example, DSL environment 102 may support any of the following, or other, DSL technologies: high-bit-rate digital subscriber line (HDSL), Asymmetric Digital Subscriber Line (ADSL), Rate Adaptive Digital Subscriber Line (RADSL), Very High Speed DSL (VDSL), Multiple Virtual Lines (MVL™) Triple-play™, and ReachDSL™. In general, communications systems employing xDSL technology use frequency-division multiplexing to multiplex digital data signals with an analog voice signal.

Figure 2:
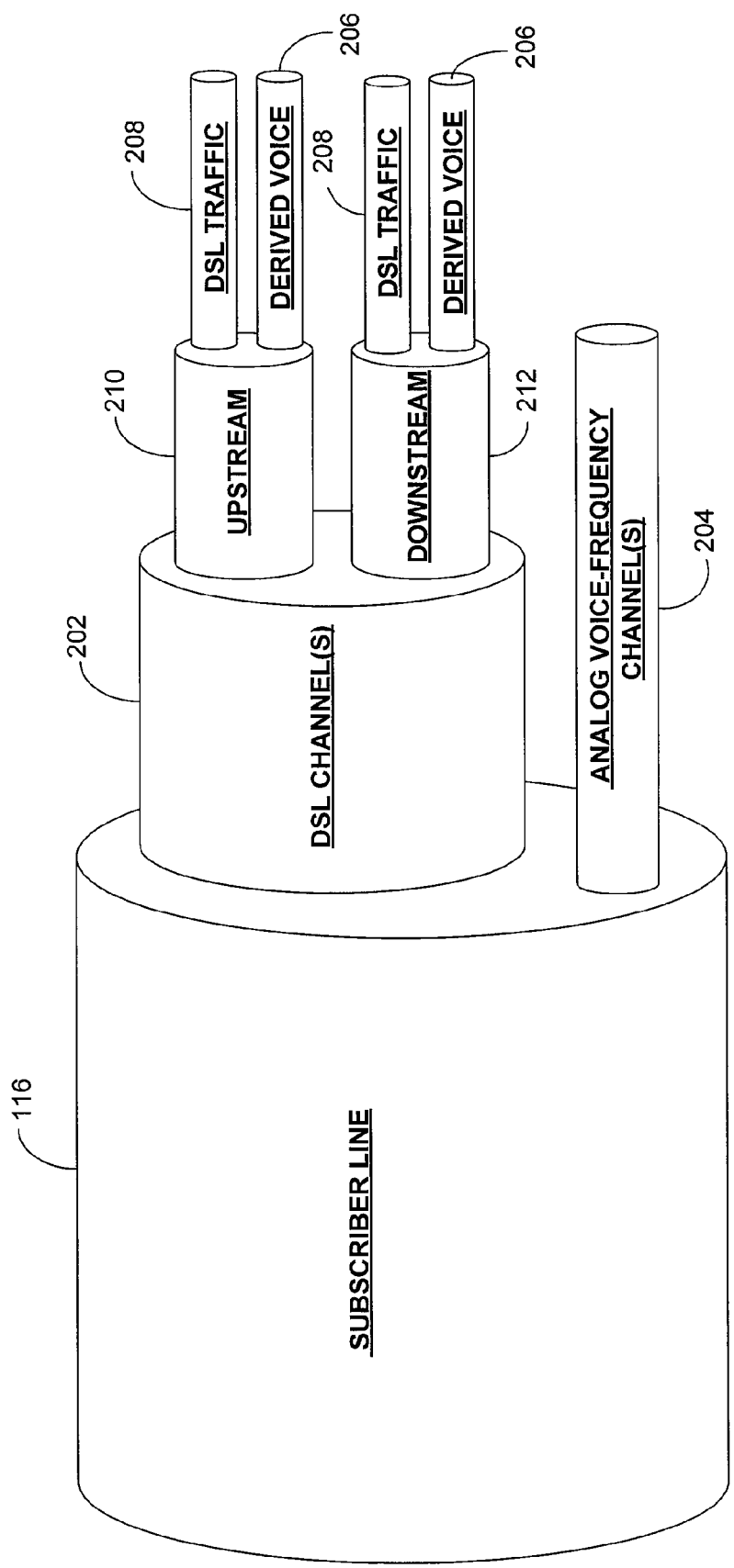
FIG. 2 is a diagram illustrating various communication channels that may be supported in the digital subscriber line environment of FIG. 1.

In order to further illustrate the general operation of DSL environment 102 and CPE 104, the various communication channels that may be supported via local loop 116 will be described with reference to FIG. 2. As illustrated in FIG. 2, communications via local loop 116 between CPE 104 and access network 106 may comprise one or more analog voice-frequency channels 204 and one or more DSL channels 202. As stated above, an analog voice-frequency channel 204 may be used to provide analog voice services (e.g., POTS). As known in the art, analog voice-frequency channels 204 communicate analog voice-frequency signals, subscriber loop signaling (e.g., CO switch signaling to the CPE of an incoming call, CPE signaling to the CO switch that the CPE is initiating a call by an on-hook to an off-hook transition, CPE signaling to the CO switch that a call should be connected to a location by transmitting the telephone number, etc.), etc. As further illustrated in FIG. 2, a DSL channel may include an upstream channel 210 corresponding to communications in the direction from CPE 104 to access network 106 and a downstream channel 212 corresponding to communications in the direction from access network 106 to CPE 104.

In addition, a DSL channel 202 may include one or more data channels 208 corresponding to DSL data and one or more derived POTS voice channels 206. As known in the art and stated above, a derived POTS voice channel 206 carries digitized voice, which is multiplexed with the DSL data. In this manner, a derived POTS voice channel 206 provides voice services via a data channel. As known in the art, the derived POTS voice channel 206 may be digitized and communicated in a variety of ways. For example, in certain embodiments, a derived POTS voice channel 206 may be digitized and communicated in any of the following, or other, ways: (1) continuous bit rate (CBR); (2) voice over DSL (VoDSL); (3) voice over IP (VoIP). Furthermore, one or ordinary skill in the art will appreciate that derived POTS voice channel may interface with PSTN 108 at various points in the network, including, for example, the local CO 118 or any other CO 118.

It should be noted that the provisioning of derived POTS voice services enables a local incumbent telephone service to be supplemented and/or replaced with another local service. In addition, derived POTS voice services enable service providers to provide alternative long distance services. Furthermore, multiple phone services may be offered over a single local loop 116 via multiple derived POTS voice channels 206.

Figure 3:
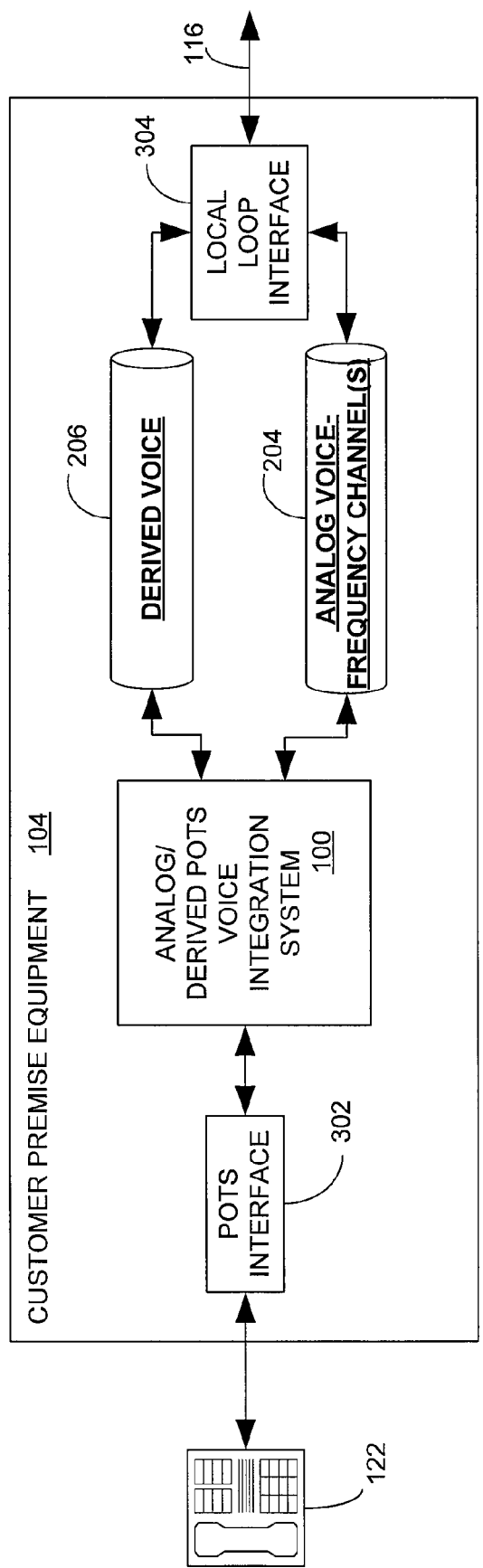
FIG. 3 is a block diagram illustrating one of a number of embodiments of the analog/derived POTS voice integration system of FIG. 1.

FIG. 3 is a block diagram of one of a number of embodiments of CPE 104, which illustrates the general operation, architecture, and/or functionality of an embodiment of analog/derived POTS voice integration system 100 according to the present invention. As illustrated in FIG. 3, CPE 104 comprises a POTS interface 302, a local loop interface 304, and analog/derived POTS voice integration system 100. POTS interface 302 may be configured to interface with, for example, a telephone-type device and local loop interface 304 may be configured to interface with local loop 116. In one of a number of embodiments, POTS interface 302 and local loop interface 304 comprise a register jack-11 (RJ-11) connector. As known in the art, an RJ-11 connector may comprise a four- or six-wire connector used for connecting telephone equipment in the United States. It should be appreciated that other connectors and/or interfaces may be used in CPE 104 for interfacing with local loop 116 and telephone 122.

In operation, analog/derived POTS voice integration system 100 facilitates communication between local loop interface 304 and POTS interface 302, thereby providing derived POTS services and analog voice-frequency voice services (e.g., POTS) to telephone-type device. As illustrated in FIG. 3, analog/derived POTS voice integration system 100 communicates with local loop interface 304 via derived POTS voice channel(s) 206 and analog voice-frequency channel(s) 204. As described in more detail below, analog/derived POTS voice integration system 100 may control analog voice-frequency calls (via an analog voice-frequency channel 204) and derived POTS voice calls (via derived POTS voice channels 206) involving a telephone-type device. In this manner, analog/derived POTS voice integration system 100 enables a user of a telephone-type device to receive both analog voice services (e.g., POTS) via an analog voice-frequency channel 204 and derived POTS voice services via a derived POTS voice channel 206. Stated another way, analog/derived POTS voice integration system 100 provides a mechanism for integrating derived POTS voice services and analog voice services provided to telephone-type device. For example, analog/derived POTS voice integration system 100 provides intelligent monitoring of an analog voice frequency channel 204, for an incoming baseband call, during a derived POTS voice call that is active via a derived POTS voice channel 206. Furthermore, by integrating the management and/or control of analog voice frequency channel(s) 204 and derived POTS voice channel(s) 206 for a telephone-type device within analog/derived POTS voice integration system 100, analog/derived POTS voice integration system 100 enables a user of the telephone-type device to manage and/or control the manner in which voice calls are established and/or processed over channels 204 and 206. Furthermore, as stated above, analog/derived POTS voice integration system 100 enables a user to automatically initiate a call via a derived POTS voice channel.

Before describing additional embodiments of analog/derived POTS integration system 100, it is worth repeating that many of the functions related to integrating analog voice services and derived POTS voice services are described relative to the analog voice services, but are also applicable to the derived POTS voice services. For instance, the embodiment illustrated in FIG. 4i s described with reference to an active derived POTS voice call (block 402); but, it should be appreciated that this embodiment may be extended to the situation where there is an active POTS call. Thus, all embodiments may be viewed as symmetrical with respect to the analog and derived POTS services.

Figure 4:
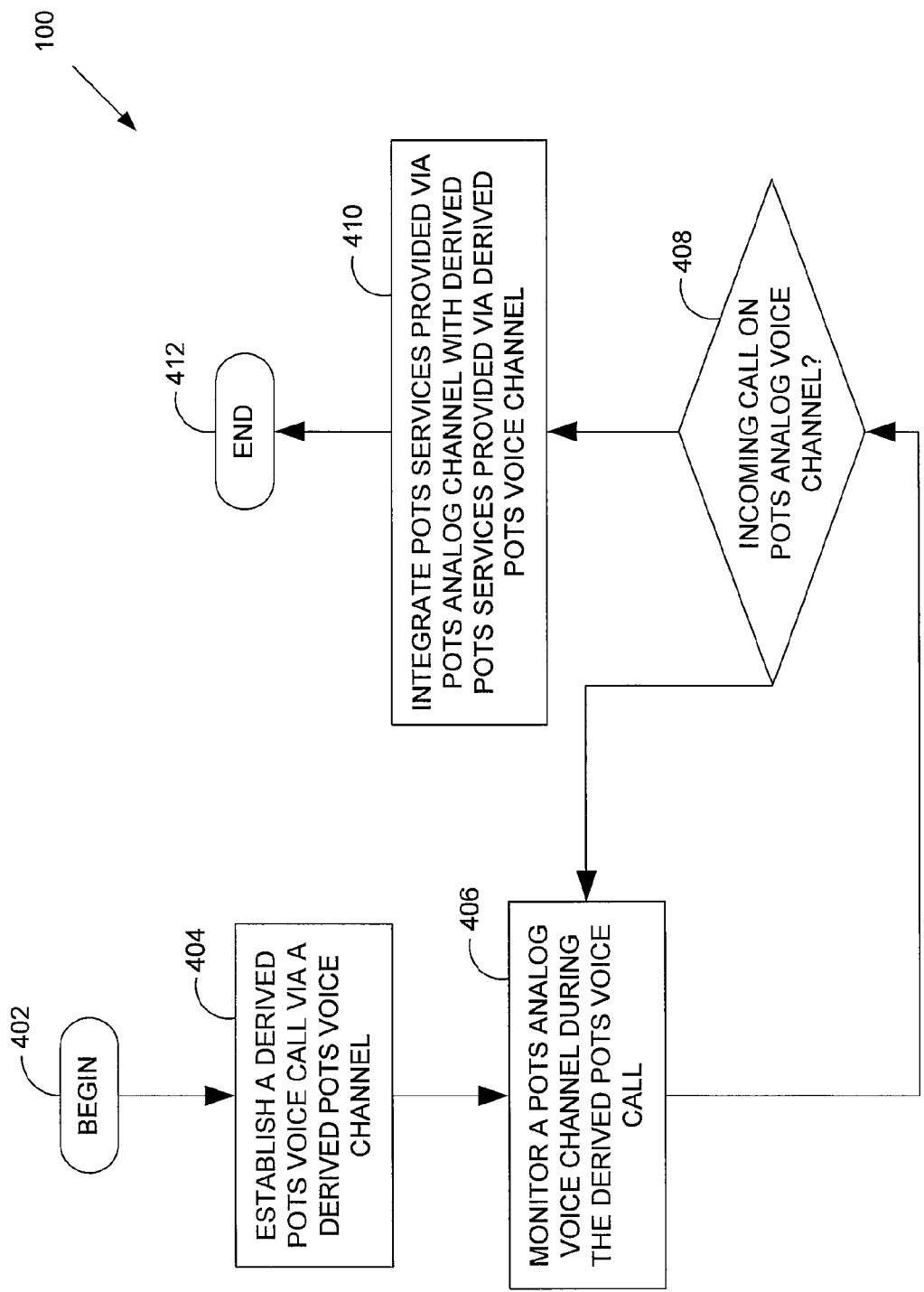
FIG. 4 is a flow chart illustrating the general architecture, functionality, and/or operation of an embodiment of the analog/derived POTS voice integration system of FIG. 3.

FIG. 4 is a flow chart illustrating the general architecture, functionality, and/or operation of an embodiment of analog/derived POTS voice integration system 100. After beginning at block 402, analog/derived POTS voice integration system 100 may establish a derived POTS voice call involving telephone-type device, at block 404, via a derived POTS voice channel 206. One of ordinary skill in the art will appreciate that, in one of a number of embodiments, the derived POTS voice call may be originated by a user of telephone-type device via POTS interface 302. In other embodiments, the derived POTS voice call may be originated by another user. For instance, analog/derived POTS voice integration system 100 may receive a request from the local loop 116, via a derived POTS voice channel 206, to initiate a derived POTS voice call with telephone-type device During the derived POTS voice call involving telephone-type device, at blocks 406 and 408, analog/derived POTS voice integration system 100 monitors an analog voice-frequency channel 204 to determine whether there is an incoming baseband call designated for telephone-type device. When an incoming baseband call is detected on the analog voice-frequency channel 204, at block 410, analog/derived POTS voice integration system 100 may integrate the derived POTS voice services and the analog voice services provided to telephone-type device in any of a number of ways. For example, after detecting an incoming baseband call designated for telephone-type device, analog/derived POTS voice integration system 100 may subsequently control and/or manage the manner in which the incoming baseband call is to be processed and/or the manner in which the active derived POTS voice call is to be processed. As mentioned above briefly, in certain embodiments, the call processing instruction(s) may be provided to analog/derived POTS voice integration system 100 by a user of telephone-type device via POTS interface 302. In these embodiments, analog/derived POTS voice integration system 100 may be configured to generate a notification signal to telephone-type device specifying that there is an incoming baseband call. Furthermore, as described in more detail below, in alternative embodiments, the call processing instruction(s) may be embodied in logic (e.g., hardware, software, firmware, or any combination thereof) to be accessed by and/or implemented by analog/derived POTS voice integration system 100. The process terminates at block 412.

Figure 5:
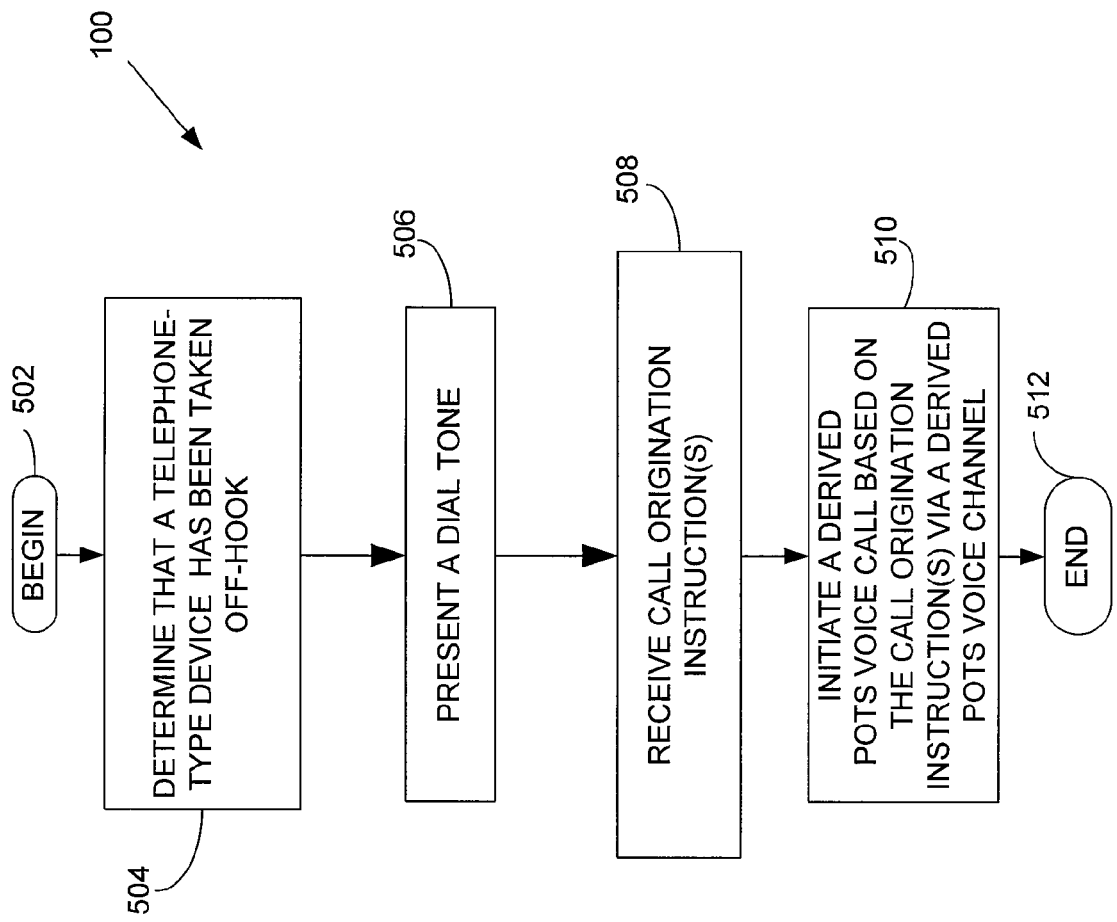
FIG. 5 is a flow chart illustrating the general architecture, functionality, and/or operation of another embodiment of the analog/derived POTS voice integration system of FIG. 3.

FIG. 5 is a flow chart illustrating the general architecture, functionality, and/or operation of another embodiment of analog/derived POTS voice integration system 100. After beginning at block 502, analog/derived POTS voice integration system 100 may determine that a telephone 122 has been taken off-hook. As known in the art, analog/derived POTS voice integration system 100 may make such a determination by receiving an off-hook signal, via POTS interface 302, which is generated by telephone-type device when, for example, the handset is taken off-hook. At block 506, analog/derived POTS voice integration system 100 may generate a dial tone to be provided to telephone-type device via POTS interface 302. In response to receiving the dial tone, a user of telephone-type device may provide call origination instruction(s) (e.g., a telephone number to dial, etc.) to CPE 104. At block 508, analog/derived POTS voice integration system 100 receives the call origination instruction(s). At block 510, analog/derived POTS voice integration system 100 initiates a derived POTS voice call based on the call origination instruction(s) via a derived POTS voice channel 206. During the derived POTS voice call, analog/derived POTS voice integration system 100 may operate in the manner described above for integrating analog voice services with the derived POTS voice services. The process terminates at block 512.

Figure 6:
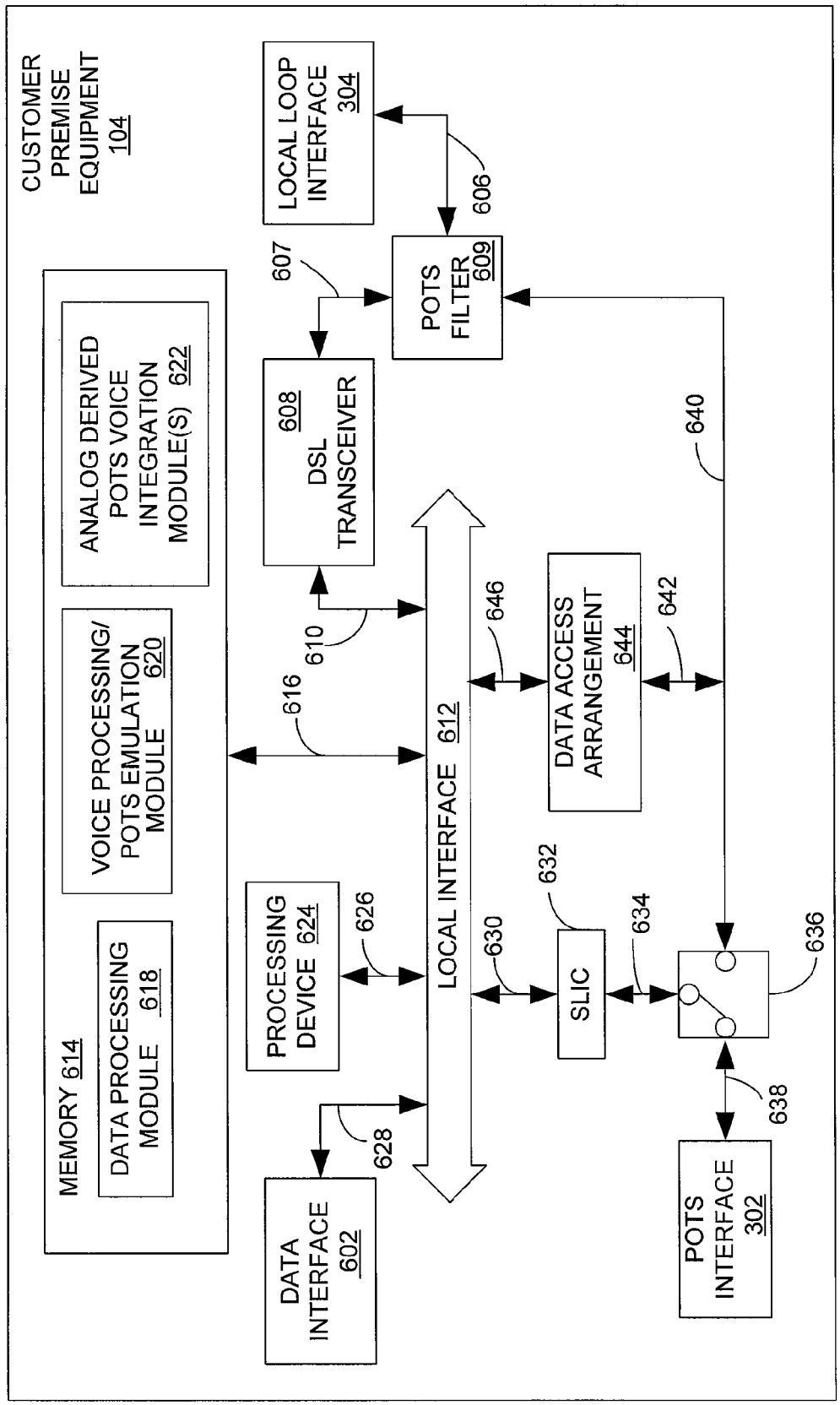
FIG. 6 is a block diagram of another embodiment of the analog/derived POTS voice integration system of FIG. 1.

FIG. 6 is a block diagram of another embodiment of analog/derived POTS voice integration system 100 according to the present invention. As described above, analog/derived POTS voice integration system 100 comprises a local loop interface 304 for interfacing with local loop 116 and a POTS interface 302 for interfacing with a telephone 122. As illustrated in FIG. 6, analog/derived POTS voice integration system 100 may further comprise a data interface 602 (e.g., RJ-45 connector, RS-232 connector, etc.) for interfacing with data equipment (e.g., computer 126, etc.). One of ordinary skill in the art will appreciate that any of a variety of other types of data interfaces may be employed depending on, for example, the type of data equipment with which CPE 104 communicates.

Analog/derived POTS voice integration system 100 may further comprise a POTS splitter 609, a DSL transceiver 608, a relay 636, a data access arrangement 644, a subscriber line interface circuit (SLIC) 632, a local interface 612, a processing device 624, and memory 614. As illustrated in FIG. 6, POTS splitter 609 communicates with local loop interface 304 via connection 606, with DSL transceiver 608 via connection 607, with relay 636 via connection 640, and with data access arrangement 644 via connections 640 and 642.

POTS splitter 609 may comprise a low pass filter that separates, or splits out, signals carried on the POTS analog voice channel 204 from the data signals carried on DSL channel(s) 202. For example, the low pass filter may be configured to pass the 0-4 kHz analog POTS signal. As known in the art, POTS splitter 609 may further comprise a high pass filter designed to pass the data signals carried on DSL channel(s) 202, which may use the portion of the available frequency spectrum above 4 kHz. Thus, POTS splitter 609 may split off the data signals from the POTS analog signal. One of ordinary skill in the art will appreciate that analog/derived POTS voice integration system 100 need not include POTS filter 609.

DSL transceiver 608 is a device configured to transmit and/or receive DSL data via DSL channel(s) 202 between local interface 612 and POTS splitter 609. One of ordinary skill in the art will appreciate that DSL transceiver receives and provides a data stream via connection 610 and receives and provides data signals via connection 607. In this regard, as known in the art, DSL transceiver 608 performs a variety of functions (e.g., sampling, digitization, modulation/demodulation, encoding/decoding, etc.).

As further illustrated in FIG. 6, DAA 644 is electrically connected to local interface 612 via connection 646 and to connection 640 via connection 642. In this manner, DAA 644 provides an interface between analog signals carried on a POTS analog voice channel 204 via connections 642 and 644 and the digital signals supported by, for example, local interface 612, data processing module 618, voice processing/POTS emulation module 620, analog/derived POTS voice integration module(s) 622, etc. For instance, DAA 644 may transmit and/or receive analog signals carried on a POTS analog voice channel 204 via connections 642 and 644. Furthermore, DAA 644 may transmit and/or receive digital signals via connection 646.

One of ordinary skill in the art will appreciate that one of a number of embodiments of DM 644 may comprise a codec for analog-to-digital and digital-to-analog conversion. It will be further appreciated that, in certain embodiments, DAA 644 may further provide high voltage isolation with surge protection, extension phone detection, line voltage/loop current sensing, sinking loop current, ring detection, etc. as known in the art. DM 644 may further comprise a processor interface for control. Referring again to FIG. 6, SLIC 632 is electrically connected to local interface 612 via connection 630 and to relay 636 via connection 634. SLIC 632 provides an interface between analog signals carried on a POTS analog voice channel via connection 634 and digital signals supported by, for example, local interface 612, data processing module 618, voice processing/POTS emulation module 620, analog/derived POTS voice integration module(s) 622, etc. For instance, SLIC 632 may receive analog signals carried on a POTS analog voice channel 204 via connection 634. Furthermore, SLIC 632 may convert the analog signals into digital signals, which may be provided to local interface 612. In this regard, one of ordinary skill in the art will appreciate that one of a number of embodiments of SLIC 632 may comprise a codec for analog-to-digital and digital-to-analog conversion. It will be further appreciated that, in certain embodiments, SLIC 632 may further provide high voltage isolation with surge protection, battery voltage generation and current feed, ring generation with automatic ring trip detection, line current and voltage monitoring for hook switch indication, etc. as known in the art. SLIC 632 may further comprise a processor interface for control.

Analog/derived POTS voice integration system 100 may comprise a variety of logic modules, which may be implemented in software, hardware, firmware, or any combination thereof. For instance, in the embodiment illustrated in FIG. 6, analog/derived POTS voice integration system 100 comprises a data processing module 618, a voice processing/POTS emulation module 620, and analog/derived POTS voice integration module(s) 622, each of which are implemented in software residing in memory 614, which is executed by a processing device 624.

Thus, where the logic modules are implemented in software as in the embodiment illustrated in FIG. 6, local interface 612 may be, for example but not limited to, one or more buses or other wired or wireless connections. The local interface 612 may have additional elements, which are omitted for simplicity, such as controllers, buffers (caches), drivers, repeaters, and receivers, to enable communications. Furthermore, the local interface 612 may include address, control, and/or data connections to enable appropriate communications among the aforementioned components.

Processing device 624 may be a hardware device for executing software, particularly that stored in memory 614. Processing device 624 may be any custom-made or commercially-available processor, a central processing unit (CPU), an auxiliary processor among several processors associated with analog/derived POTS voice integration system 100, a semiconductor based microprocessor (in the form of a microchip or chip set), a macroprocessor, or generally any device for executing software instructions.

As illustrated in FIG. 6, memory 614 may comprise data processing module 618, voice processing/POTS emulation module 620, and analog/derived POTS voice integration module(s) 622. In alternative embodiments, memory 614 may further comprise an operating system and/or other software modules, applications, etc. Memory 614 may include any one or combination of volatile memory elements (e.g., random access memory (RAM, such as DRAM, SRAM, SDRAM, etc.)) and nonvolatile memory elements (e.g., ROM, hard drive, tape, CDROM, etc.). Memory 614 may incorporate electronic, magnetic, optical, and/or other types of storage media. Furthermore, memory 614 may have a distributed architecture, in which various components are situated remote from one another, but can be accessed by processing device 624.

The software in memory 614 may include one or more separate programs, each of which comprises executable instructions for implementing logical functions. As mentioned above, memory 614 may further comprise a suitable operating system that controls the execution of other computer programs, and provides scheduling, input-output control, file and data management, memory management, and communication control and related services.

When implemented in software, data processing module 618, voice processing/POTS emulation module 620, and analog/derived POTS voice integration module(s) 622 may be a source program, executable program (object code), script, or any other entity comprising a set of instructions to be performed. When implemented as a source program, then the program needs to be translated via a compiler, assembler, interpreter, or the like, which may or may not be included within the memory 614. Furthermore, data processing module 618, voice processing/POTS emulation module 620, and analog/derived POTS voice integration module(s) may be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

As known in the art, data processing module 618 may comprise the logic for controlling communication between DSL transceiver 608 and the data equipment that is electrically coupled to data interface 602. Thus, it will be appreciated that data processing module 618 may process the information carried on DSL traffic channels 208.

One of ordinary skill in the art will further appreciate that voice processing/POTS emulation module 620 may comprise the logic for controlling derived POTS voice calls being carried via derived POTS voice channel(s) 206 between local loop interface 304 and POTS interface 302. For example, voice processing/POTS emulation module 620 may comprise logic for emulating a POTS subscriber loop. Thus, voice processing/POTS emulation module 620 may comprise logic for emulating any of the following, or other, POTS functions: holding current/battery voltage, dial tone, ringing, on-hook, off-hook, codec, conference/bridging, etc. As illustrated in FIG. 6, voice processing/POTS emulation module 620 may provide the derived POTS voice services to POTS interface 302 via the communication path through connection 630, SLIC 632, connection 634, relay 636, and connection 638. As further illustrated in FIG. 6, voice processing/POTS emulation module 620 may receive digital representations of analog voice signals and/or POTS signals from SLIC 632 via connection 630. For example, analog voice signals and/or POTS signals may be provided by a telephone via POTS interface 302. As described in more detail below, these signals may be provided to SLIC 632 through relay 636. SLIC 632 may convert these analog signals into digital representations. Voice processing/POTS emulation module 620 may receive the digital representations and process them according to any of a variety of protocols (e.g., VoIP, VoDSL, etc.). As known in the art, the digital representations processed by voice processing/POTS emulation module 620 and the data signals processed by data processing module 618 may be multiplexed as illustrated in FIG. 2 and communicated via DSL transceiver 608 to local loop interface 304.

As described above with respect to FIG. 3, analog/derived POTS voice integration system 100 may control analog voice-frequency calls (via an analog voice-frequency channel 204) and derived POTS voice calls (via derived POTS voice channels 206) involving a telephone-type device electrically connected to POTS interface 302. Analog/derived POTS voice integration system 100 enables a user of a telephone 122 to receive both analog voice services (e.g., POTS) via an analog voice-frequency channel 204 and derived POTS voice services via a derived POTS voice channel 206. Referring to FIG. 6, the derived POTS voice calls may be controlled by voice processing/POTS emulation module 620 and provided via the communication path through connection 630, SLIC 632, connection 634, relay 636, connection 638, and POTS interface 302. Analog/derived POTS voice integration system 100 may integrate analog voice services with derived POTS voice services by monitoring an analog voice frequency channel 204.

For example, referring to FIG. 6, an analog voice frequency channel 204 may be provided to data access arrangement 644 via connections 642 and 640. Data access arrangement 644 may convert the analog signals into digital representations that may be provided to analog/derived POTS voice integration module(s) 622 via connection 646. In this regard, the management and/or control of analog voice frequency channel(s) 204 and derived POTS voice channel(s) 206 may be integrally controlled via analog/derived POTS voice integration module(s) 622. For example, in one of many possible embodiments, analog/derived POTS voice integration module 622 may be configured to control relay 636. In this manner, analog/derived POTS voice integration module 622 may control whether POTS interface 302 is in communication with voice processing/POTS emulation module 620 (i.e., whether derived POTS voice services are being provided to POTS interface 302 via a derived POTS voice channel 206) or whether analog voice services are being provided via an analog voice frequency channel 204 on connection 640. Analog/derived POTS voice integration module 622 may provide control signal(s) to relay 636 to switch between these two configurations.

Thus, analog/derived POTS voice integration system 100 provides a communication path on which an analog voice frequency channel 204 may received. Then, the signals carried on the voice frequency channel 204 may be converted into digital representations, which may be monitored by logic embodied in software, hardware, firmware, or any combination thereof (i.e., analog/derived POTS voice integration module(s) 622). With this in mind, one of ordinary skill in the art will further appreciate that analog/derived POTS voice integration module(s) 622 may be configured in a variety of ways to integrate analog voice services provided via analog voice frequency channel 204 with derived POTS voice services provided via a derived POTS voice channel 206.

As illustrated in FIG. 6, relay 636 further communicates with POTS interface 302 via connection 638 and with SLIC 632 via connection 634. Relay 636 may comprise an electro-mechanical switch or any other type of switching mechanism that controls whether POTS interface 302 is in communication with POTS splitter 609 via connection 640 or in communication with SLIC 623 via connection 634 based on control signal(s) provided via connection 634. For instance, as described in more detail below, when POTS interface 302 is in communication with SLIC 632, derived POTS voice services may be provided to a user of a telephone-type-device via a derived voice channel 206 (FIG. 3). In addition, when POTS interface 302 is in communication with POTS splitter 609, POTS services may be provided to the user via a POTS analog voice channel 204 (FIG. 3).

One of ordinary skill in the art will appreciate that the control signal(s) for relay 636 may be controlled in a number of ways. For example, in one embodiment, the control signal(s) may be provided to relay 636 via connection 638 by, for example, a user of a telephone-type device. As described below in more detail below, in other embodiments, the control signal(s) may be controlled by logic (e.g., firmware, software, hardware, or any combination thereof).

As stated above, analog/derived POTS voice integration system 100 integrates derived POTS voice services and analog voice services by providing a mechanism for monitoring an analog voice frequency channel 204. In this regard, analog/derived POTS voice integration system 100 further comprises a feedback loop by which an analog voice frequency channel 204 may be monitored. In the embodiment illustrated in FIG. 6, an analog voice frequency channel 204 carried on connection 640 may be monitored via connection 642 and data access arrangement 644. Data access arrangement 644 may comprise codec that receives the signals on an analog voice frequency channel 204 and provides them in digital form to local interface 612 via connection 646. In this manner, analog/derived POTS voice integration system 100 may monitor the analog voice frequency channel 204 to determine whether there is an incoming baseband call. In the embodiment illustrated in FIG. 6, this functionality, and other analog/derived POTS voice integration functions, may be embodied in logic residing in memory 614 (e.g., analog/derived POTS voice integration module(s) 622).

Figure 7:
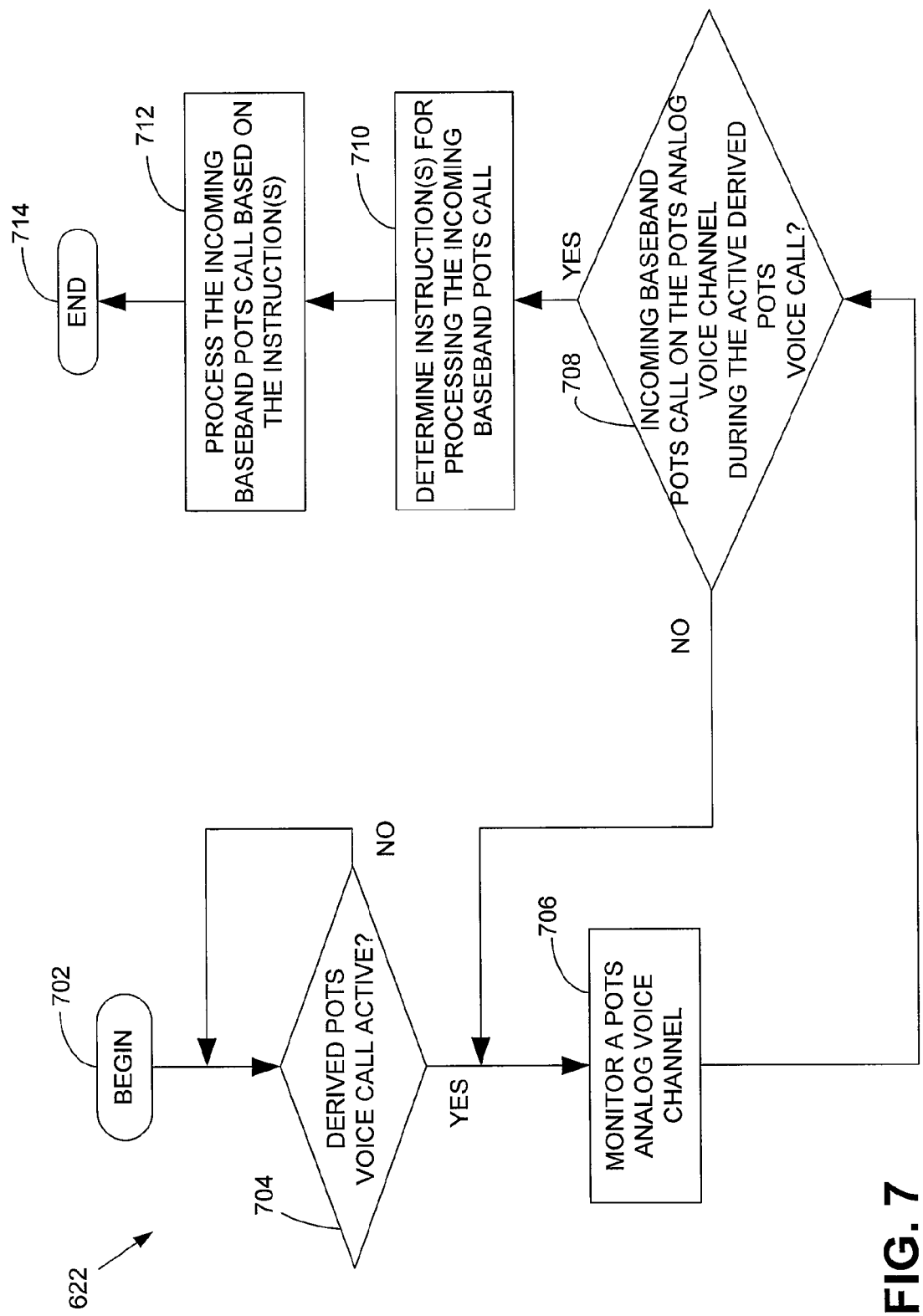
FIG. 7 is a flow chart illustrating the general architecture, operation, and/or functionality of one of a number of embodiments of the analog/derived POTS voice integration module of FIG. 6.

FIG. 7 is a flow chart illustrating the general architecture, operation, and/or functionality of one of a number of embodiments of analog/derived POTS voice integration module 622. After beginning at block 702, at block 704, analog/derived POTS voice integration module 622 determines whether a derived POTS voice call is active via a derived POTS voice channel 206. While the derived POTS voice call is active, flow continues to blocks 706, 708, 710, and 712. At block 706, analog/derived POTS voice integration module 622 may monitor an analog voice frequency channel 204. As described above, the analog signals carried on an analog voice frequency channel 204 may be provided to a data access arrangement 644 (FIG. 6) where they are converted into digital representations and processed by analog/derived POTS voice integration module 622. At block 708, analog/derived POTS voice integration module 622 may determine whether there is an incoming baseband call on the analog voice frequency channel 204 during the active derived POTS voice call. If an incoming baseband call is detected, at block 710, analog/derived POTS voice integration module 622 may then determine the manner in which the incoming baseband call is to be processed (i.e., determine call processing instruction(s) for the incoming baseband call). At block 712, analog/derived POTS voice integration module 622 may then process the incoming baseband call according to the call processing instruction(s).

As stated above, the call processing instruction(s) may be determined in a variety of ways. In certain embodiments, the call processing instruction(s) may be received by a user of the telephone-type device electrically coupled to POTS interface 302 (FIG. 6). For example, analog/derived POTS voice integration module 622 may notify the user of telephone-type device that there is an incoming baseband call (e.g., provide a notification signal, flash a display, etc.). Referring to FIG. 6, the notification signal (or other signal) may be provided to the user via the communication path through connection 630, SLIC 632, connection 634, relay 636, connection 638, and POTS interface 302. The user may then specify to analog/derived POTS voice integration module 622 the manner in which the incoming baseband call is to be processed. In this manner, analog/derived POTS voice integration module 622 may enable the user to, for example, place the derived POTS voice call on hold and answer the incoming baseband call, conference the incoming baseband call with the derived POTS voice call, etc.

Figure 8:
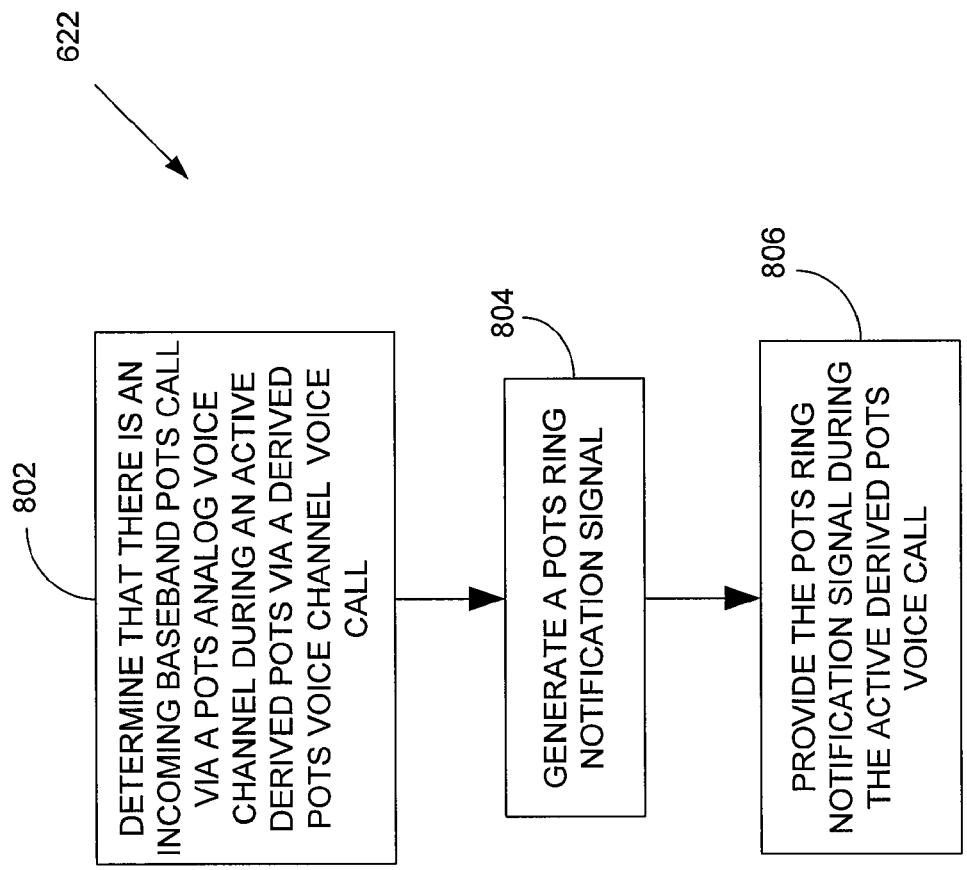
FIG. 8 is a flow chart illustrating the general architecture, operation, and/or functionality of another embodiment of the analog/derived POTS voice integration module of FIG. 6.

FIG. 8 illustrates the architecture, operation, and/or functionality of another embodiment of analog/derived POTS voice integration module 622, according to the present invention. At block 802, analog/derived POTS voice integration module 622 may determine that there is an incoming baseband call in the manner described above. At block 804, analog/derived POTS voice integration module 622 may generate a signal (e.g., a POTS ring notification signal). At block 806, analog/derived POTS voice integration module 622 may provide the signal to a telephone via the communication path through connection 630, SLIC 634, relay 636, connection 638, and POTS interface 302. One of ordinary skill in the art will appreciate that the ring notification signal may be configured to function as an audio or sound advisory, a visual or display advisory, etc.

Figure 9:
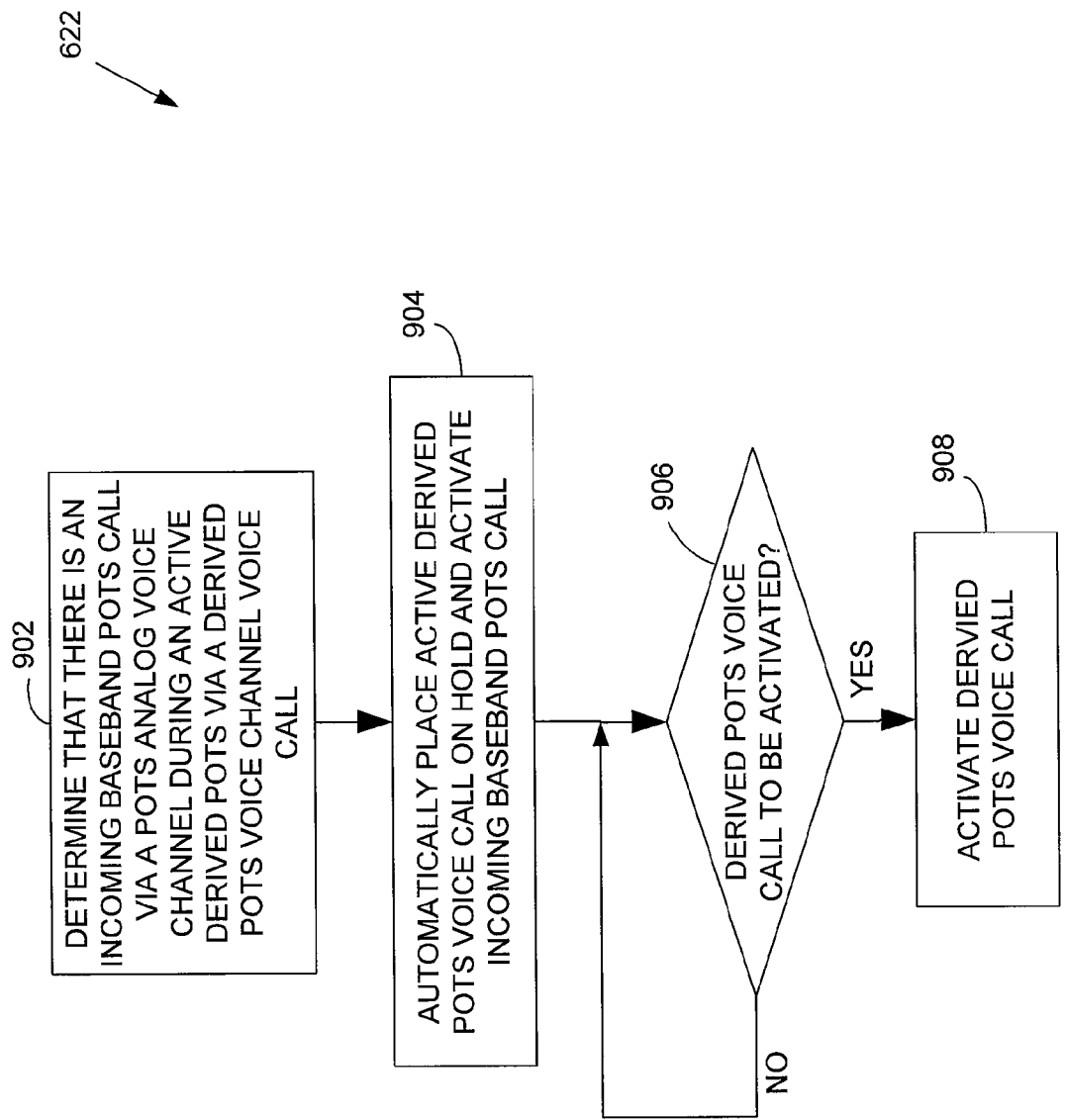
FIG. 9 is a flow chart illustrating the general architecture, operation, and/or functionality of a further embodiment of the analog/derived POTS voice integration module of FIG. 6.

FIG. 9 illustrates the architecture, operation, and/or functionality of another embodiment of analog/derived POTS voice integration module 622. At block 902, analog/derived POTS voice integration module 622 may determine that there is an incoming baseband call in the manner described above. In response to the incoming baseband call being detected, at block 904, analog/derived POTS voice integration module 622 may automatically place the active derived POTS voice call on hold and activate the incoming baseband POTS call. As described above, analog/derived POTS voice integration module 622 may provide a control signal to relay 636 (FIG. 6), which enables POTS interface 302 to establish the incoming baseband POTS call via connection 640. At decision block 906, analog/derived POTS voice integration module 622 may determine whether the derived POTS voice call is to be re-activated. For example, a user may switch back to the derived POTS voice call by providing an appropriately configured signal via the communication path through POTS interface 302, connection 638, relay 636, connection 634, SLIC 632, and connection 634. If analog/derived POTS voice integration module 622 receives such a signal, at block 908, analog/derived POTS voice integration module 622 may re-activate the derived POTS voice call by controlling the relay 636 as described above.

Figure 10:
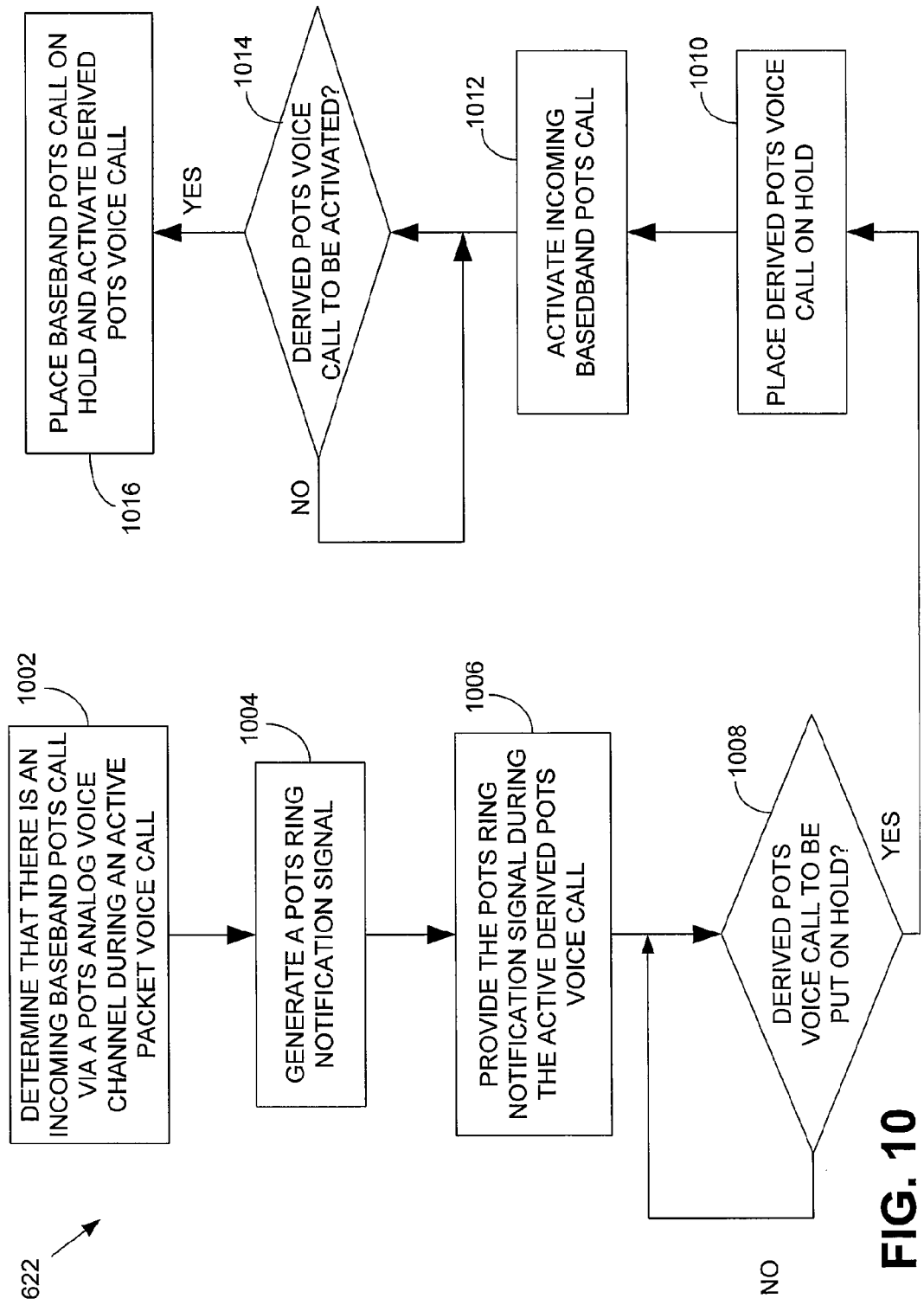
FIG. 10 is a flow chart illustrating the general architecture, operation, and/or functionality of yet another embodiment of the analog/derived POTS voice integration module of FIG. 6.

As illustrated in FIG. 10, in yet another embodiment, analog/derived POTS voice integration module 622 may be configured such that a user may control whether the incoming baseband call is answered and/or the active derived POTS voice call is placed on hold. At block 1002, analog/derived POTS voice integration module 622 may determine that there is an incoming baseband call in the manner described above. At block 1004, analog/derived POTS voice integration module 622 may generate a signal (e.g., a POTS ring notification signal) and, at block 1006, provide the signal to a telephone via the communication path through connection 630, SLIC 634, relay 636, connection 638, and POTS interface 302. As illustrated by decision block 1008, analog/derived POTS voice integration module 622 may determine that the derived POTS call is to be placed on hold and the incoming baseband call is to be answered. For instance, analog/derived POTS voice integration module 622 may determine this by receiving a signal provided by the user. In response to receiving the signal provided by the user, at blocks 1010 and 1012, analog/derived POTS voice integration module 622 may place the derived POTS voice call on hold and activate the incoming baseband POTS call by controlling relay 636. As illustrated by decision block 1014 and block 1016, analog/derived POTS voice integration module 622 may be configured to switch between the incoming baseband call and the derived POTS voice call by controlling relay 636.

In other embodiments, analog/derived POTS voice integration module 622 may determine the call processing instruction(s) based on logic (e.g., software, firmware, and/or hardware or any combination thereof) residing in memory 614 (FIG. 6) and/or external logic with which analog/derived POTS voice integration module 622 is in communication. Thus, analog/derived POTS voice integration module 622 may implement logic which provides any of a number of analog/derived POTS voice integration services.

Figure 11:
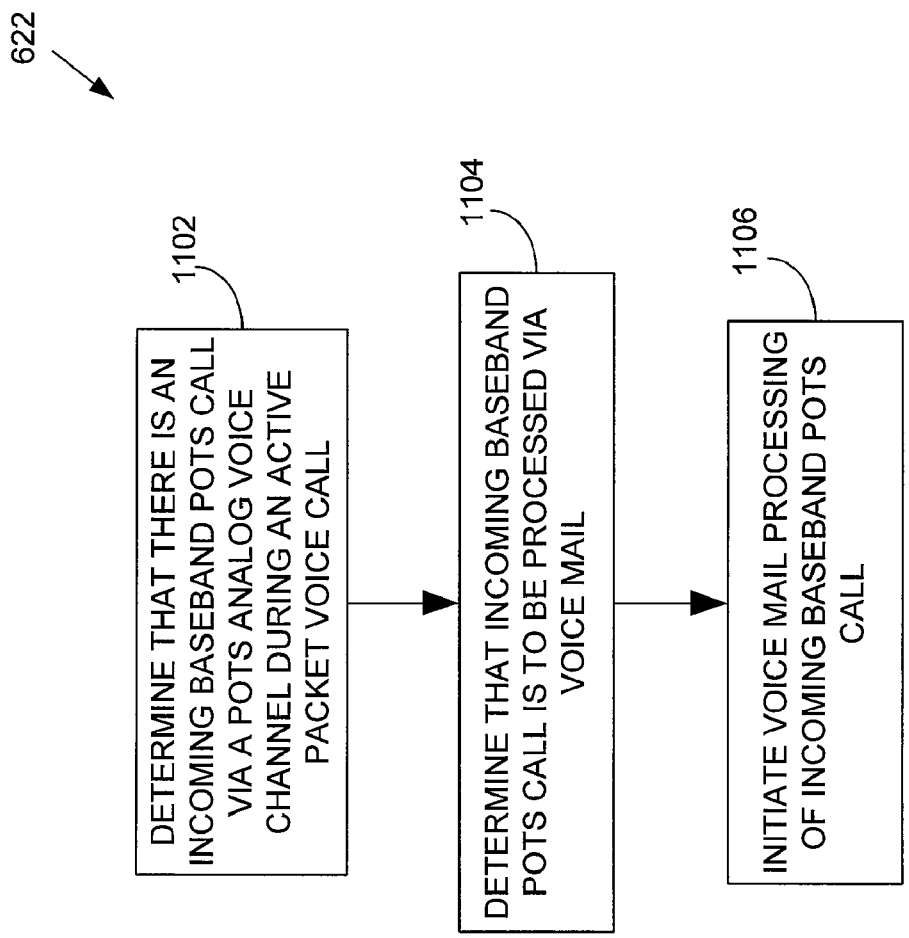
FIG. 11 is a flow chart illustrating the general architecture, operation, and/or functionality of yet another embodiment of the analog/derived POTS voice integration module of FIG. 6.

FIG. 11 illustrates the architecture, operation, and/or functionality of another embodiment of analog/derived POTS voice integration module 622 for integrating an answering machine function with derived POTS voice services. Referring again to FIG. 11, the answering machine function may be implemented in a variety of ways. For example, the answering machine function may be configured as disclosed in commonly-assigned U.S. Pat. No. 5,719,922, entitled "Simultaneous Voice/Data Answering Machine," which is hereby incorporated by reference in its entirety. At block 1102, analog/derived POTS voice integration module 622 may determine that there is an incoming baseband call during an active derived POTS voice call. At block 1104, analog/derived POTS voice integration module 622 may determine that the incoming baseband call is to be processed via voice mail. This may be determined based on preprogrammed logic. For instance, analog/derived POTS voice integration module 622 may be configured to automatically forward incoming baseband calls to voice mail when a derived POTS voice call is active. In further embodiments, analog/derived POTS voice integration module 622 may be configured to enable a user to determine whether the incoming baseband call is to be answered via an answering machine functionality. Regardless of the triggering condition for answering the incoming baseband call via voice, at block 1106, analog/derived POTS voice integration module 622 may initiate voice mail processing. One of ordinary skill in the art will appreciate that voice mail processing may reside locally (e.g., within analog/derived POTS voice integration system 100, within CPE 104, etc.). In alternative embodiments, voice mail processing may be provided via access network 304 by a voice mail service provider.

Figure 12:
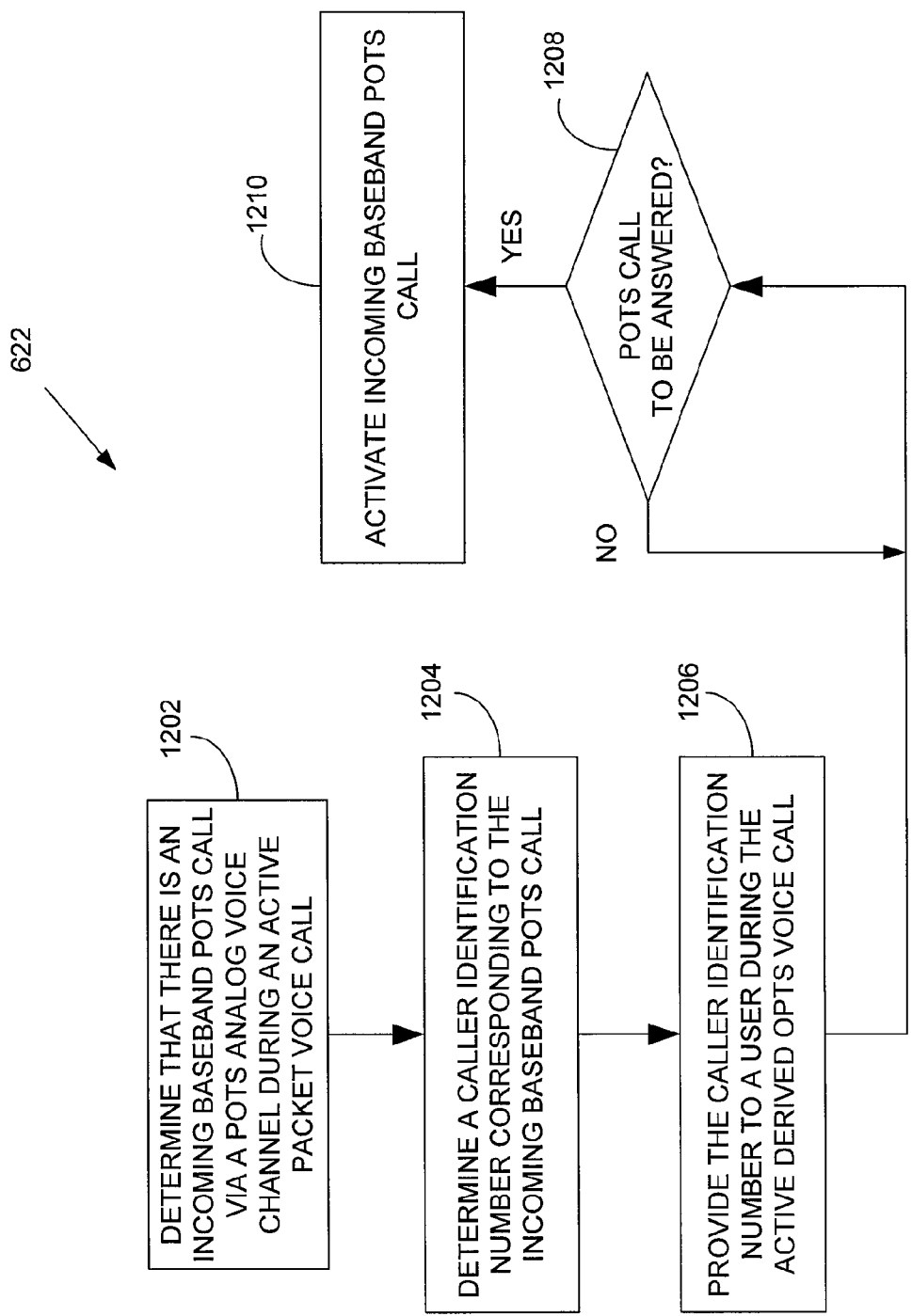
FIG. 12 is a flow chart illustrating the general architecture, operation, and/or functionality of yet another embodiment of the analog/derived POTS voice integration module of FIG. 6.

FIG. 12 illustrates the architecture, operation, and/or functionality of another embodiment of analog/derived POTS voice integration module 622 for integrating caller identification services with the derived POTS services. At block 1202, analog/derived POTS voice integration module 622 may determine that there is an incoming baseband call as described above. At block 1204, analog/derived POTS voice integration module 622 may determine a caller identification number corresponding to the incoming baseband call. For instance, where a caller identification service has been established, this information may be provided on the analog voice frequency channel 204. The caller identification information may be converted to a digital representation by data access arrangement 644 and detected by analog/derived POTS voice integration module 622. At block 1206, analog/derived POTS voice integration module 622 may then provide the caller identification number to the user, during the active derived POTS voice call, via the communication path through connection 630, SLIC 632, connection 634, relay 636, connection 638, and POTS interface 302. As illustrated at decision block 1208 and block 1210, the incoming baseband call may be answered based on the caller identification number. For instance, after receiving the caller identification number, the user may decide that the incoming baseband call is to be answered, in which case an appropriate signal is provided to analog/derived POTS voice integration module 622 to activate the incoming baseband call and place the derived POTS voice call on hold. One of ordinary skill in the art will appreciate that, in alternative embodiments, the incoming baseband call may be automatically processed based on the caller identification number. Analog/derived POTS voice integration module 622 may be further configured to provide general identification screening as described in commonly-assigned U.S. Pat. No. 5,301,246 entitled "Data Communications Equipment Security," which is incorporated by reference in its entirety.

Figure 13:
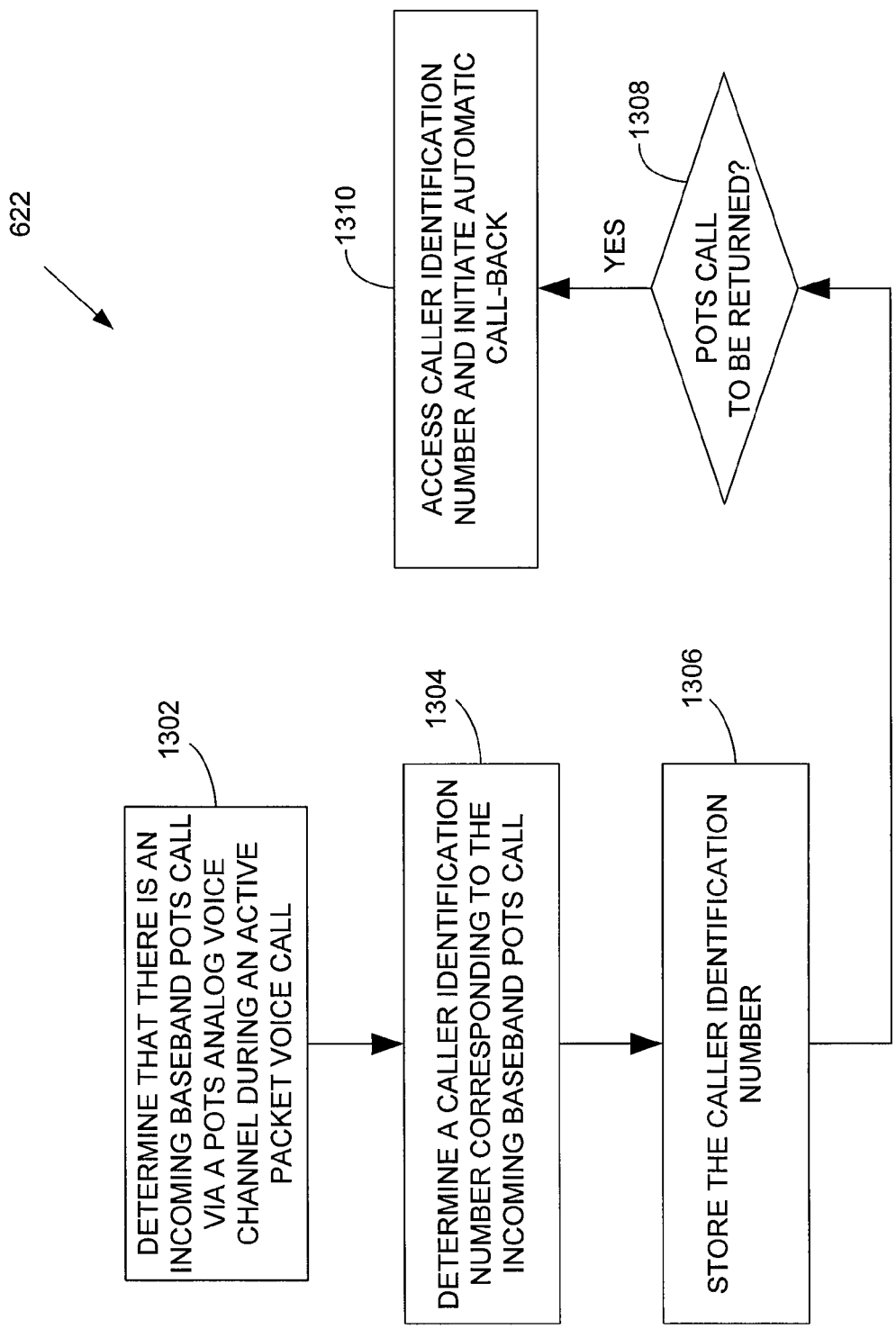
FIG. 13 is a flow chart illustrating the general architecture, operation, and/or functionality of yet another embodiment of the analog/derived POTS voice integration module of FIG. 6.

FIG. 13 illustrates the architecture, operation, and/or functionality of an embodiment of analog/derived POTS voice integration module 622, according to the present invention, for integrating an automatic callback service with the derived POTS voice services. At blocks 1302 and 1304, analog/derived POTS voice integration module 622 may determine that there is an incoming baseband call and determine a caller identification number corresponding to the call as described above. At block 1306, analog/derived POTS voice integration module 622 may store the caller identification number, for example, in memory 614 (FIG. 6). At decision block 1308, analog/derived POTS voice integration module 622 may determine that the incoming baseband call is to be returned. One of ordinary skill in the art will appreciate that this decision may be made in a variety of ways. For instance, this decision may be initiated by a user. Regardless of the manner in which this decision is initiated, if the call is to be returned, at block 1308, analog/derived POTS voice integration module 622 accesses the caller identification number and initiates automatic call-back based on the caller identification number.

One of ordinary skill in the art will appreciate that analog/derived POTS voice integration system 100 may be configured to implement any of the following, or other, call processing functions: call waiting, voice quality of service (QoS) selection, call processing via an interactive voice response system, call processing via voice control, custom local area signaling system (CLASS) services, etc.

Figure 14:
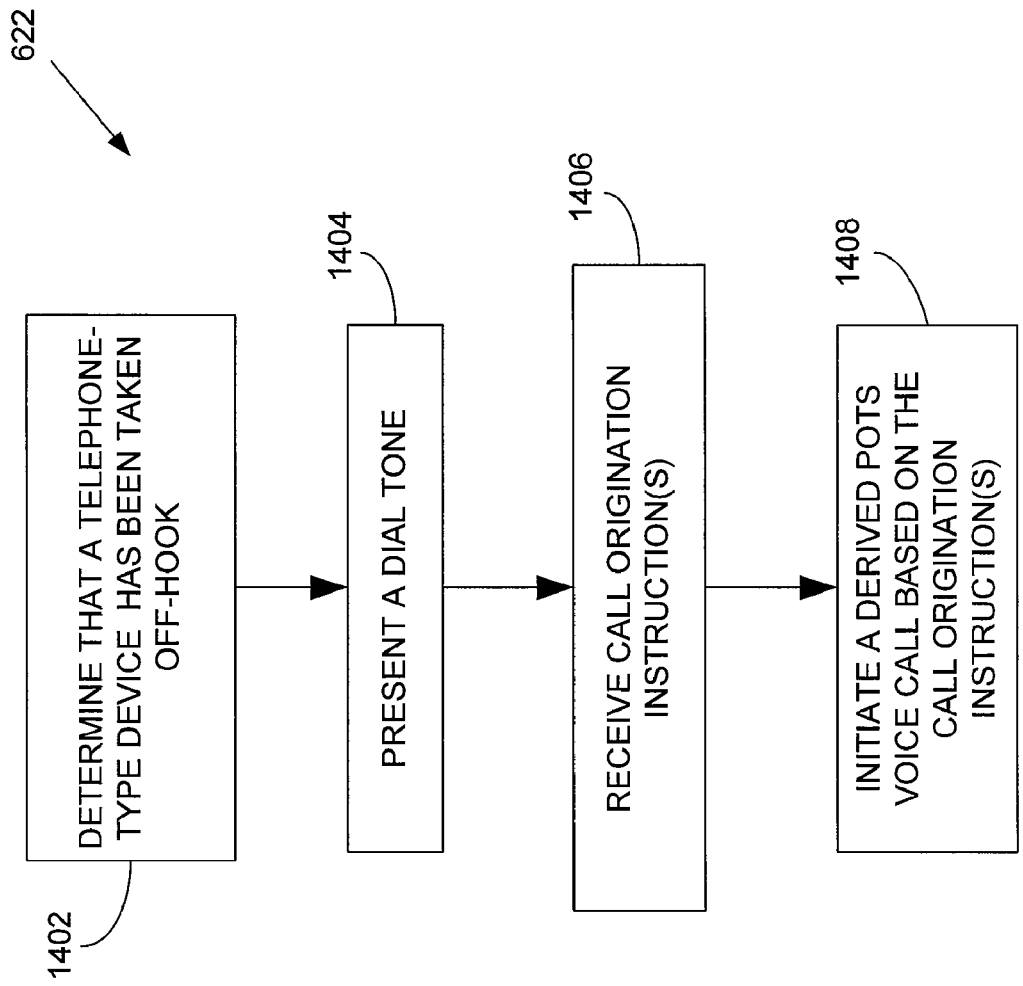
FIG. 14 is a flow chart illustrating the general architecture, operation, and/or functionality of yet another embodiment of the analog/derived POTS voice integration module of FIG. 6.

Furthermore, it should be noted that analog/derived POTS voice integration module 622 may be configured to enable a user to automatically initiate a call via a derived POTS voice channel. FIG. 14 illustrates the architecture, operation, and/or functionality of an embodiment of analog/derived POTS voice integration module 622, according to the present invention, for providing this functionality. At block 1402, analog/derived POTS voice integration module 622 may determine that a telephone that is electrically coupled to POTS interface 302 has been taken off-hook. For instance, as known in the art, the telephone may generate an off-hook signal, which may be detected by analog/derived POTS voice integration module 622 via the communication path through POTS interface 302, connection 638, relay 636, connection 634, SLIC 632, and connection 630. At block 1404, analog/derived POTS voice integration module 622 may present a dial tone on the same communication path. At block 1406, analog/derived POTS voice integration module 622 may receive call original instruction(s) from the user. For instance, the user may provide a telephone number to call by entering digits on a touch-tone keypad using dual tone multifrequency (DTMF) tones. At block 1408, analog/derived POTS voice integration module 622 may then initiate a derived POTS voice call based on the call origination instructions. One of ordinary skill in the art will appreciate that all, or a portion of the functionality represented by blocks 1402, 1404, 1406, and 1408 may be provided by voice processing/POTS emulation module 622.

Figure 15:
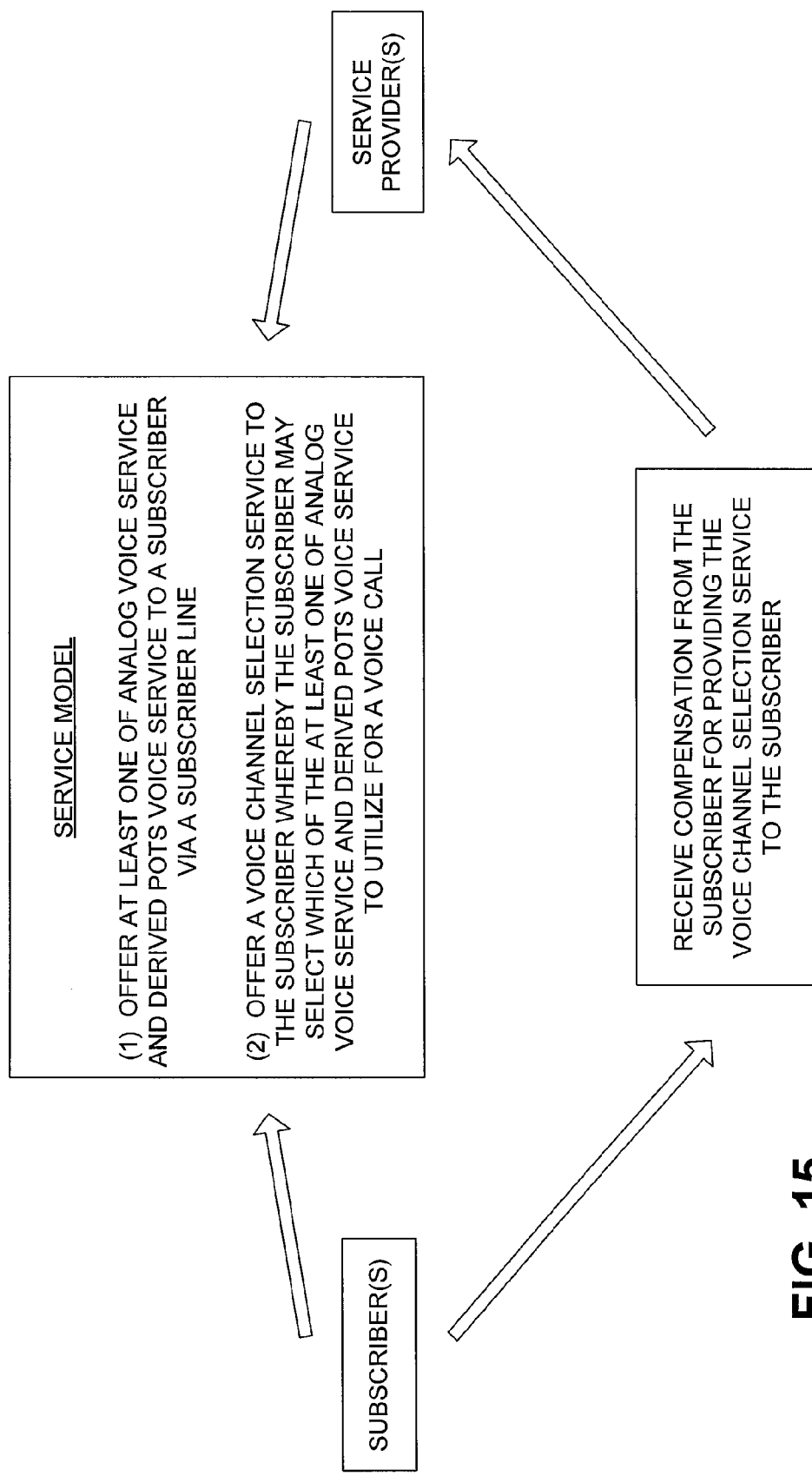
FIG. 15 is a block diagram illustrating an embodiment of a method according to the present invention, which may be implemented by one or more service providers, for leveraging the systems and methods illustrated in FIGS. 1-14.

With reference to DSL environment 102 illustrated in FIG. 1, it will be appreciated that the various embodiments of analog/derived POTS voice integration system 100 and analog/derived POTS voice integration module(s) 622 may enable one or more services providers to offer any of the analog/derived POTS voice integration services described above. For example, FIG. 15 is a block diagram illustrating an embodiment of a method according to the present invention, which may be implemented by one or more service providers for leveraging the systems and methods illustrated in FIGS. 1-14. As illustrated in FIG. 15, a service provider may: (1) offer analog voice service and/or derived POTS voice service to a subscriber via a subscriber line; and (2) offer a voice channel selection service to the subscriber whereby the subscriber may select which of the analog voice service or the derived POTS voice service to utilize for a voice call. Stated another way, the voice channel selection service enables the subscriber to control whether analog voice service or derived POTS voice service are to be provided to a subscriber telephone. As further illustrated in FIG. 15, the service provider may receive compensation from the subscriber for providing the voice channel selection service. In this manner, the one or more service providers may receive subscription revenue for providing the voice channel selection service.

It should be appreciated that the voice channel selection service may include any of the services described above (e.g., analog/derived POTS voice integration services, etc.), which are enabled by analog/derived POTS voice integration system 100 and/or analog/derived POTS voice integration module(s) 622. One of ordinary skill in the art will further appreciate that the analog voice service and derived POTS service may be offered by the same service provider. In other embodiments, the analog voice service may be provided by one service provider (e.g., an incumbent local exchange carrier (ILEC), a competitive local exchange carrier (CLEC), an interexchange carrier (IXC), etc.), while the derived POTS voice service may be provided by a separate data service provider. It should be appreciated that, where separate service providers are used, it may be advantageous for one, or both, of the service providers to establish a business relationship related to the voice channel selection service. For example, the analog voice service provider (who also provides the voice channel selection service) may engage in a business relationship with a data service provider. Although the particulars of the business relationship may take a variety of forms, in one of many possible embodiments, the analog voice service provider may receive compensation from the data service provider for offering the voice channel selection service to the subscriber and thereby enabling the subscriber to utilize derived POTS voice service provided by the data service provider.

Furthermore, in embodiments where analog/derived POTS voice integration system 100 and/or analog/derived POTS voice integration module(s) 622 are implemented in software, as is shown in FIG. 6, analog/derived POTS voice integration system 100 and/or analog/derived POTS voice integration module(s) 622 may be stored on any computer-readable medium for use by or in connection with any computer related system or method. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In alternative embodiments where analog/derived POTS voice integration system 100 and/or analog/derived POTS voice integration module(s) 622 are implemented in hardware, analog/derived POTS voice integration system 100 and/or analog/derived POTS voice integration module(s) 622 may be implemented with any or a combination of the following, or other, technologies: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

It should be emphasized that the above-described embodiments of analog/derived POTS voice integration system 100 and/or analog/derived POTS voice integration module(s) 622, particularly, any "described" embodiments, are merely possible examples of implementations, merely set forth for a clear understanding of the principles of the invention. Many variations and modifications may be made to the above-described embodiment(s) of the invention without departing substantially from the spirit and principles of the invention. For example, it should be appreciated that analog/derived POTS voice integration system 100 and/or analog/derived POTS voice integration module(s) 622 may be configured to simultaneously implement multiple derived POTS channels (s) during operation. This and all modifications and variations are intended to be included herein within the scope of this disclosure and protected by the following claims.

Therefore, having thus described the invention, at least the following is claimed:

1. A device comprising:
   memory having stored thereon program code; and
   a processor that is programmed by at least the program code to enable the device to:
      monitor a subscriber loop for signaling associated with a call, the subscriber loop carrying an analog POTS channel and a derived POTS channel;
      responsive to subscriber loop signaling on one of the channels, determine whether the call is processed using the analog POTS channel or the derived POTS channel;
      process the call using one of the channels according to the determination; monitor, while a first call is active on one of the channels of the subscriber loop, the other channel of the subscriber loop to detect call signaling indicative of a second incoming call on the other channel;
      determine call instructions for the second incoming call; and
      process the second incoming call according to the call instructions.

2. A device comprising
   memory having stored thereon program code; and
   a processor that further programmed by at least the program code to enable the device to:
   monitor a subscriber loop for signaling associated with a call, the subscriber loop carrying an analog POTS channel and a derived POTS channel;
   responsive to subscriber loop signaling on one of the channels, determine whether the call is processed using the analog POTS channel or the derived POTS channel;
   process the call using one of the channels according to the determination; monitor, while a first call is active on one of the channels of the subscriber loop, the other channel of the subscriber loop to detect call signaling indicative of a second incoming call on the other channel;
   responsive to the detected call signaling, place on hold the first call on the one channel; and answer the second call on the second channel.

3. A device comprising:
   memory having stored thereon program code; and
   a processor that is further programmed by at least the program code to enable the device to:
      monitor a subscriber loop for signaling associated with a call, the subscriber loop carrying an analog POTS channel and a derived POTS channel;
      responsive to subscriber loop signaling on one of the channels, determine whether the call is processed using the analog POTS channel or the derived POTS channel;

process the call using one of the channels according to the determination; monitor, while a first call is active on one of the channels of the subscriber loop, the other channel of the subscriber loop to detect call signaling indicative of a second incoming call on the other channel; and conference the first call on the one channel with the second call on the second channel.

4. A device comprising:

memory having stored thereon program code; and a processor that is programmed by at least the program code to enable the device to:

monitor a subscriber loop for signaling associated with a call, the subscriber loop carrying an analog POTS channel and a derived POTS channel; responsive to subscriber loop signaling on one of the channels, determine whether the call is processed using the analog POTS channel or the derived POTS channel; process the call using one of the channels according to the determination; monitor, while a first call is active on one of the channels of the subscriber loop, the other channel of the subscriber loop to detect call signaling indicative of a second incoming call on the other channel; and provide, responsive to the detected call signaling and while the first call is active, a ring notification signal to a user.

5. A device comprising:

memory having stored thereon program code; and a processor that is further programmed by at least the program code to enable the device to:

monitor a subscriber loop for signaling associated with a call, the subscriber loop carrying an analog POTS channel and a derived POTS channel;

responsive to subscriber loop signaling on one of the channels, determine whether the call is processed using the analog POTS channel or the derived POTS channel; process the call using one of the channels according to the determination; monitor, while a first call is active on a first one of the channels, the second other one of the channels to detect call signaling, the call signaling associated with an incoming call, the incoming call associated with a calling number;

responsive to the detected call signaling, drop the incoming call on the second channel; and originate on the first channel a second call to the calling number when the first call is no longer active.

6. A device comprising:

memory having stored thereon program code; and a processor that is further programmed by at least the program code to enable the system to:

monitor a subscriber loop for signaling associated with a call, the subscriber loop carrying an analog POTS channel and a derived POTS channel; responsive to subscriber loop signaling on one of the channels, determine whether the call is processed using the analog POTS channel or the derived POTS channel; process the call using one of the channels according to the determination;

monitor, while a first call is active on a first one of the channels, the second other one of the channels to detect call signaling, the call signaling associated with a second incoming call;

while the first call is active, provide an indication of the second incoming call to a user;

upon receiving an indication from the user to switch to the second incoming call, put the first call on hold and switching to the second incoming call.

7. A non-transitory computer-readable medium having a program comprising the steps of:

monitoring a subscriber loop for signaling associated with a call, the subscriber loop carrying an analog POTS channel and a derived POTS channel;

responsive to subscriber loop signaling on one of the channels, determining whether the call is processed using the analog POTS channel or the derived POTS channel;

processing the call using one of the channels according to the determination;

monitoring, while a first call is active on the analog POTS channel of the subscriber loop, the derived POTS channel of the subscriber loop to detect call signaling indicative of a second incoming call on the derived POTS channel; and responsive to the detected call signaling, forwarding the second call on the derived POTS channel to voicemail.

8. A non-transitory computer-readable medium having a program comprising the steps of:

monitoring a subscriber loop for signaling associated with a call, the subscriber loop carrying an analog POTS channel and a derived POTS channel;

responsive to subscriber loop signaling on one of the channels, determining whether the call is processed using the analog POTS channel or the derived POTS channel;

processing the call using one of the channels according to the determination; monitoring, while a first call is active on the derived POTS channel of the subscriber loop, the analog POTS channel of the subscriber loop to detect call signaling indicative of a second incoming call on the analog POTS channel; and responsive to the detected call signaling, forwarding the second call on the analog POTS channel to voicemail.

9. A non-transitory computer-readable medium having a program comprising the steps of:

monitoring a subscriber loop for signaling associated with a call, the subscriber loop carrying an analog POTS channel and a derived POTS channel;

responsive to subscriber loop signaling on one of the channels, determining whether the call is processed using the analog POTS channel or the derived POTS channel;

processing the call using one of the channels according to the determination; monitoring, while a first call is active on the analog POTS channel of the subscriber loop, the derived POTS channel of the subscriber loop to detect call signaling indicative of a second incoming call on the derived POTS channel; and responsive to the detected call signaling, placing on hold the first call on the analog POTS channel and answering the second call on the derived POTS channel.

10. A non-transitory computer-readable medium having a program comprising the steps of:

monitoring a subscriber loop for signaling associated with a call, the subscriber loop carrying an analog POTS channel and a derived POTS channel;

responsive to subscriber loop signaling on one of the channels, determining whether the call is processed using the analog POTS channel or the derived POTS channel;

processing the call using one of the channels according to the determination; monitoring, while a first call is active on the derived POTS channel of the subscriber loop, the analog POTS channel of the subscriber loop to detect call signaling indicative of a second incoming call on the analog POTS channel; and responsive to the detected call signaling, placing on hold the first call on the derived POTS channel and answering the second call on the analog POTS channel.

11. A device comprising:
means for monitoring a subscriber loop for signaling associated with a call, the subscriber loop carrying an analog POTS channel and a derived POTS channel;
means for determining, responsive to subscriber loop signaling on one of the channels, whether the call is processed using the analog POTS channel or the derived POTS channel;
means for processing the call using one of the channels according to the determination;
means for monitoring, while a first call is active on one of the channels of the subscriber loop, the other channel of the subscriber loop to detect call signaling indicative of a second incoming call on the other channel;
means for determining call instructions for the second incoming call; and
means for processing the second incoming call according to the call instructions.

12. A device comprising:
means for monitoring a subscriber loop for signaling associated with a call the subscriber loop carrying an analog POTS channel and a derived POTS channel;
means for determining, responsive to subscriber loop signaling on one of the channels, whether the call is processed using the analog POTS channel or the derived POTS channel;
means for processing the call using one of the channels according to the determination;
means for monitoring, while a first call is active on a first one of the channels, the second other one of the channels to detect call signaling, the call signaling associated with an incoming call, the incoming call associated with a calling number;
means for dropping, responsive to the detected call signaling, the incoming call on the second channel; and
means for originating on the first channel a second call to the calling number when the first call is no longer active.

13. The device of claim 1, wherein the processor is further programmed to enable the system to provide, responsive to the detected call signaling and while the first call is active, a notification signal to a user.

14. The device of claim 1, wherein the processor is further programmed to enable the system to forward, responsive to the detected call signaling, the second call to voicemail.

15. The device of claim 1, wherein the processor is further programmed to enable the system to forward, upon receiving an indication from the user, the second call to voicemail.

16. The device of claim 2, wherein the processor is further programmed to enable the system to provide, responsive to the detected call signaling and while the first call is active, a calling number associated with the second incoming call to a user.

17. The device of claim 3, wherein the processor is further programmed to enable the system to provide, responsive to the detected call signaling and while the first call is active, a calling number associated with the second incoming call to a user.

18. The device of claim 3, wherein the processor is further programmed to enable the system to provide, responsive to the detected call signaling and while the first call is active, a notification signal to a user.

19. The device of claim 4, wherein the processor is further programmed to enable the system to, upon receiving an indication from the user to switch to the second incoming call, put the first call on hold and switch to the second incoming call.

20. The device of claim 5, wherein the processor is further programmed to enable the system to provide, responsive to the detected call signaling and while the first call is active, the calling number to a user.

21. The computer-readable medium of claim 7, the program further comprising the step of provide, responsive to the detected call signaling and while the first call is active, a notification signal to a user.

22. The computer-readable medium of claim 8, the program further comprising the step of provide, responsive to the detected call signaling and while the first call is active, a notification signal to a user.

23. The computer-readable medium of claim 9, the program further comprising the step of provide, responsive to the detected call signaling and while the first call is active, a notification signal to a user.

24. The computer-readable medium of claim 10, the program further comprising the step of provide, responsive to the detected call signaling and while the first call is active, a notification signal to a user.

* * * * *